(12) United States Patent
Ikemoto et al.

(10) Patent No.: US 7,085,467 B2
(45) Date of Patent: Aug. 1, 2006

(54) THREE-DIMENSIONAL PERIODIC STRUCTURE, FUNCTIONAL ELEMENT INCLUDING THE SAME, AND LIGHT-EMITTING DEVICE

(75) Inventors: Kiyokatsu Ikemoto, Utsunomiya (JP); Akinari Takagi, Utsunomiya (JP); Hikaru Hoshi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 11/071,381

(22) Filed: Mar. 3, 2005

(65) Prior Publication Data

US 2005/0196118 A1    Sep. 8, 2005

(30) Foreign Application Priority Data

Mar. 8, 2004  (JP)  ............................. 2004-063965
Jan. 25, 2005  (JP)  ............................. 2005-016793

(51) Int. Cl.
*G02B 6/10*  (2006.01)

(52) U.S. Cl. .................. 385/129; 385/14; 385/130; 385/131

(58) Field of Classification Search ......... 385/129–131
See application file for complete search history.

(56) References Cited

U.S. PATENT DOCUMENTS 5,335,240 A      8/1994   Ho
5,406,573 A *   4/1995   Ozbay et al. ............ 372/43.01
6,134,043 A     10/2000   Johnson
6,392,787 B1    5/2002   Cirelli
2005/0150864 A1* 7/2005   Stasiak et al. ................ 216/41

OTHER PUBLICATIONS

Eli Yabonovitch, Inhibited Spontaneous Emission in Solid-State Physics & Electronics, Physical Review Letters, vol. 58 No. 20, pp. 2059-2062, May 18, 1987.
Martin Maldovan, et al., layer-by-layer Dimond-like Woodpile Structure with A Large Photonic Band Gap, Applied Physics Letters, vol. 84 No. 3 pp. 362-364 Jan. 19, 2004.
Feigel A , et al., "Overlapped Woodpile Photonic Crystals", Applied Optics, Optical Society of America, Washington, US vol. 43 No. 4 , pp. 793-795, Feb. 1, 2004.

* cited by examiner

*Primary Examiner*—Sung Pak
*Assistant Examiner*—James D. Stein
(74) *Attorney, Agent, or Firm*—Canon U.S.A. Inc. IP Division

(57) ABSTRACT

A three-dimensional periodic structure exhibiting a complete photonic band gap in a wide wavelength range and being readily produced, as well as a functional element including the same, is provided. In the three-dimensional periodic structure exhibiting a photonic band gap according to the present invention, layers composed of a plurality of square columns spaced apart by a predetermined interval are stacked sequentially with additional layers therebetween, rectangular parallelepipeds contained in the additional layers are disposed at the positions corresponding to the intersections of the square columns, and $1.21 \leq W1/W \leq 2.39$ and $W/W1 < W2/W$ are satisfied, where W1 and W2 represent lengths of sides of the rectangular parallelepiped and W represents the width of the square column, each in a plane parallel to the layer containing the square columns.

11 Claims, 25 Drawing Sheets

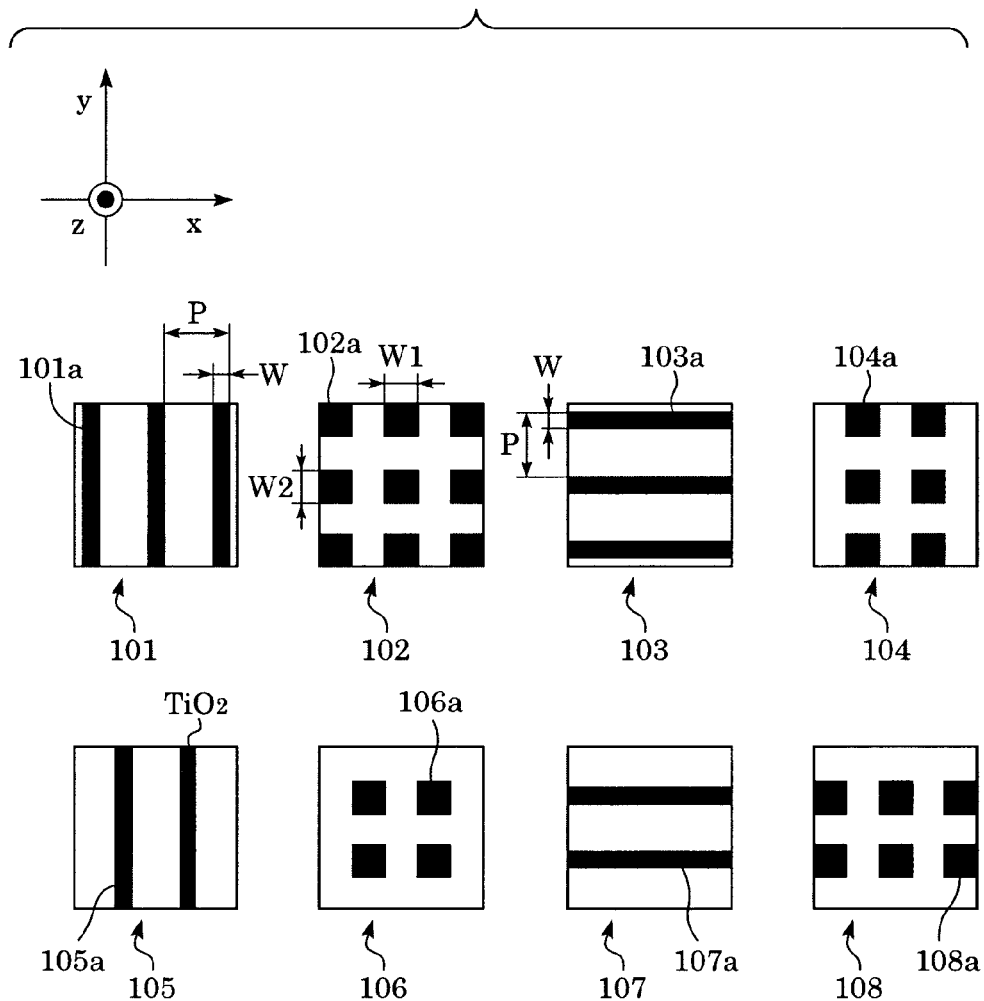

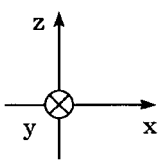
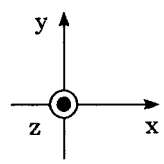
FIG. 20A   FIG. 20B   FIG. 20C
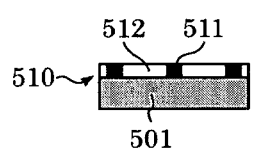
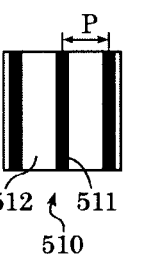
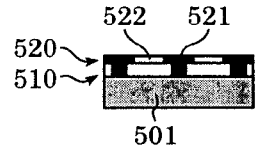
FIG. 20D   FIG. 20E   FIG. 20F
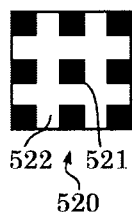
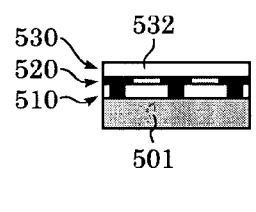
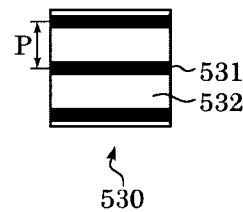
FIG. 20G   FIG. 20H   FIG. 20I
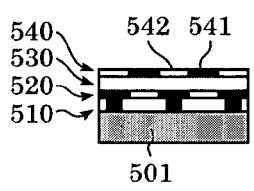
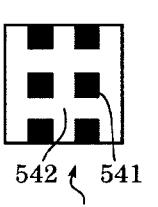
FIG. 20J   FIG. 20K
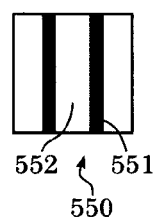
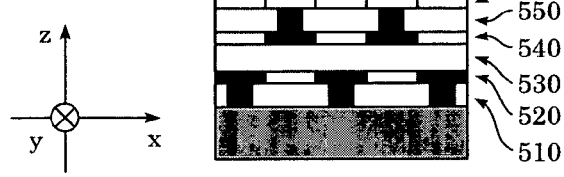

DIAMOND OPAL STRUCTURE

WOODPILE STRUCTURE

SPECIFIC THREE DIMENSIONAL STRUCTURE

HELICAL STRUCTURE

INVERSE STRUCTURE

DIAMOND WOODPILE STRUCTURE

US 7,085,467 B2

THREE-DIMENSIONAL PERIODIC STRUCTURE, FUNCTIONAL ELEMENT INCLUDING THE SAME, AND LIGHT-EMITTING DEVICE

This application is related to co-pending application Ser. No. 11/062,157 filed on Feb. 18, 2005.

BACKGROUND OF THE INVENTION

1. Field of the Invention

The present invention relates to a three-dimensional periodic structure exhibiting a photonic band gap, a functional element including the same, and a light-emitting device.

2. Description of the Related Art

The concept that the transmission-reflection characteristics and the like of an electromagnetic waves are controlled by a structure that is smaller than or equal to a wavelength of light has been previously proposed by Yablonovitch (Physical Review Letters, Vol. 58, pp. 2059, 1987). According to this document, the transmission-reflection characteristics and the like of electromagnetic waves can be controlled by periodically arranging structures smaller than or equal to the wavelength of light, and the transmission-reflection characteristics of light can be controlled by reducing the wavelength of the electromagnetic waves to an order of the wavelength of the light. Such a structure is known as a photonic crystal, and it is indicated that a reflecting mirror having a reflectance of 100% and exhibiting no optical loss can be realized at some wavelength range. The above-described concept that the reflectance of 100% can be achieved at some wavelength range is referred to as a photonic band gap in contradistinction to an energy gap of a known semiconductor. The photonic band gap can be realized relative to light incident from every direction by making the structure a fine three-dimensional periodic structure. Hereafter, this is referred to as a complete photonic band gap. When the complete photonic band gap can be realized, various applications can be performed, for example, spontaneous emission from a light-emitting device can be reduced. Therefore, unprecedented and new functional elements can be realized. Furthermore, there is a demand for a functional element having a structure suitable for realizing a complete photonic band gap in a wider wavelength range.

Some structures exhibiting the above-described photonic band gap have been proposed (e.g., U.S. Pat. No. 6,392,787, U.S. Pat. No. 6,134,043, and Applied Physics Letters, Vol. 84, No. 3, pp. 362, 2004). Examples of three-dimensional periodic structures capable of realizing a complete photonic band gap include a diamond opal structure, a woodpile structure, a helical structure, a specific three-dimensional periodic structure, a structure realized by inverting the above-described three-dimensional periodic structure (an inverse structure), and a diamond woodpile structure, shown in FIGS. 21A to 21F in that order.

In general, three-dimensional periodic structures exhibiting photonic band gaps have structures that are small and are not readily producible. Consequently, very few three-dimensional periodic structures are operated in light wave ranges (wavelength of a few micrometers or less in a vacuum).

Under such circumstances, the woodpile structure shown in FIG. 21B proposed in U.S. Pat. No. 5,335,240 is a structure which can be produced by stacking two-dimensional periodic structures. Therefore, among three-dimensional structures, the woodpile structure is the only one structure in which a photonic band gap has been experimentally observed. However, the woodpile structure has a small photonic band gap width as compared to an inverse opal structure, which is believed to have the largest wavelength width of photonic band gap. Consequently, there is a problem in that realization of optical elements, e.g., waveguides and wavelength selection filters, which are operated in wide wavelength bands, are difficult. The diamond woodpile structure shown in FIG. 21F, proposed in Applied Physics Letters, Vol. 84, No. 3, pp. 362, 2004, is a structure in which square prisms are disposed between square columns, the square prism having a square bottom and a side length equal to the width of the square column. The diamond woodpile structure exhibits a photonic band gap slightly wider than that of the woodpile structure, although the difference therebetween is small. On the other hand, it is difficult to produce the inverse opal structure by a technique used for a known semiconductor production process.

SUMMARY OF THE INVENTION

The present invention is directed to a three-dimensional periodic structure exhibiting a photonic band gap in a wide wavelength range and being readily produced, as well as a functional element incorporating the three-dimensional periodic structure, and a light-emitting device incorporating said functional element. A three-dimensional periodic structure according to an aspect of the present invention exhibits a photonic band gap and includes a first layer including a plurality of square columns spaced apart by a predetermined interval; a second layer including a plurality of square columns spaced apart by a predetermined interval, the square columns extending in a direction different from that of the above-described square columns in the first layer; a third layer including a plurality of square columns spaced apart by a predetermined interval, the square columns extending in the same direction as that of the above-described square columns in the first layer; a fourth layer including a plurality of square columns spaced apart by a predetermined interval, the square columns extending in the same direction as that of the above-described square columns in the second layer; and additional layers, each including one layer containing rectangular parallelepipeds disposed discretely in a plane parallel to each of the above-described four layers, wherein the first layer to the fourth layer are stacked sequentially with the additional layer between the individual layers, the first layer and the third layer are stacked such that the square columns contained in the two layers mutually shift by one-half the above-described predetermined interval in a direction perpendicular to the direction of the extension of the square columns, the second layer and the fourth layer are stacked such that the square columns contained in the two layers mutually shift by one-half the above-described predetermined interval in a direction perpendicular to the direction of the extension of the square columns, rectangular parallelepipeds contained in the above-described additional layers are disposed at the positions corresponding to the intersections of the above-described square columns, the square columns contained in the above-described first layer to the fourth layer and the rectangular parallelepipeds contained in the above-described additional layers are formed from a first medium, regions contained in the above-described first layer to the fourth layer other than the square columns and regions contained in the above-described additional layers other than the rectangular parallelepipeds are formed from a second medium having a refractive index lower than that of the above-described first medium, when the length of one side of the rectangular parallelepiped contained in the above-described additional layer is assumed to be W1 in a plane parallel to each of the above-described layers and the width of the above-described square column in the direction perpendicular to the direction of extension of the above-described square columns is assumed to be W in a plane parallel to each of the above-described layers, $$1.21 \leq W1/W \leq 2.39$$

is satisfied, and when the length of the other side perpendicular to the side having a length of W1 of the rectangular parallelepiped contained in the above-described additional layer is assumed to be W2 in a plane parallel to each of the above-described layers, $$W/W1 < W2/W$$

is satisfied.

A three-dimensional periodic structure according to another aspect of the present invention has a structure similar to the above-described three-dimensional periodic structure, except that each additional layer includes at least two layers containing rectangular parallelepipeds disposed discretely in a plane parallel to each of the four layers, wherein when the length of a side of the rectangular parallelepiped contained in the additional layer adjacent to the layer containing the square columns is assumed to be W1 in a plane parallel to each of the layers, the side being along the direction perpendicular to the direction of extension of the adjacent square column, and the width of the square column in the direction perpendicular to the direction of extension of the square column is assumed to be W in a plane parallel to each of the layers, $$0.81 \leq W1/W \leq 1.87$$

is satisfied, and when the length of a side of the rectangular parallelepiped contained in the additional layer adjacent to the layer containing the square columns is assumed to be W2 in a plane parallel to each of the layers, the side being along the direction parallel to the direction of extension of the adjacent square column, $$W/W1 < W2/W$$

is satisfied.

In yet another aspect of the present invention, a functional element comprising a structure in which a plurality of the above-described three-dimensional periodic structures are stacked, wherein the structure includes a linear defect portion, and the linear defect portion functions as a waveguide. In yet still another aspect of the present invention, a functional element comprising a structure in which a plurality of the above-described three-dimensional periodic structures are stacked, wherein the structure comprises an point defect portion, and the point defect portion functions as a resonator.

In yet still another aspect of the present invention, a light-emitting device includes the above-described functional element having the point defect portion, an active medium capable of emitting light and disposed in the point defect portion, and an excitation component configured to excite the active medium.

According to the present invention, a three-dimensional periodic structure exhibiting a complete photonic band gap in a wide wavelength band compared with that in the known three-dimensional periodic structure and being readily produced is provided. A functional element which is operated in a wider wavelength band can be realized by constructing the functional element including the three-dimensional periodic structure of the present invention. Furthermore, high-performance microcircuits can be realized by combining those various functional elements.

Further features and advantages of the present invention will become apparent from the following description of exemplary embodiments with reference to the attached drawings.

BRIEF DESCRIPTION OF THE DRAWINGS

FIG. 1B is an x-y sectional view of each layer shown in FIG. 1A.

FIGS. 20A to 20K are explanatory diagrams of a method for producing a three-dimensional periodic structure.

FIG. 21A shows a diamond opal structure, FIG. 21B shows a woodpile structure, FIG. 21C shows a helical structure, FIG. 21D shows a specific three-dimensional structure, FIG. 21E shows an inverse structure, and FIG. 21F shows a diamond woodpile structure.

DESCRIPTION OF THE EMBODIMENTS

First Embodiment

Figure 1A:
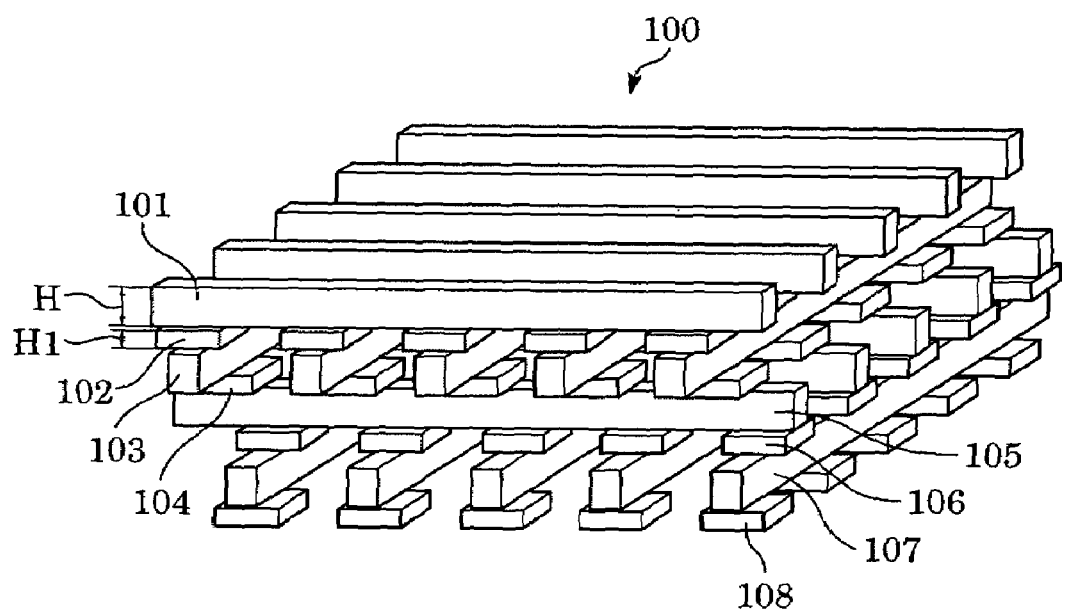
FIG. 1A is a perspective view of a key portion of a first embodiment.

FIG. 1A is a perspective view of a key portion of a three-dimensional periodic structure in accordance with a first embodiment of the present invention. The three-dimensional periodic structure 100 includes eight layers 101 to 108 in x-y planes as a basic period. FIG. 1B is a perspective view showing a part of an x-y section of each of the layers 101 to 108. In the first layer 101 and the fifth layer 105, a plurality of square columns 101a and 105a made of a first medium (high refractive index) extending in the y axis direction are spaced at regular intervals (Pitches) P in the x direction, and the square columns 101a and 105a are arranged at positions shifted from each other by P/2 in the x axis direction. In the third layer 103 and the seventh layer 107, a plurality of square columns 103a and 107a made of the first medium extending in the x axis direction are spaced at regular intervals P in the y direction, and the square columns 103a and 107a are arranged at positions shifted from each other by P/2 in the y axis direction.

In the second layer (additional layer) 102, rectangular parallelepipeds 102a made of the first medium are disposed discretely at positions corresponding to the intersections of the square columns 101a in the first layer 101 and the square columns 103a in the third layer 103 such that the rectangular parallelepipeds do not contact with each other in the x-y plane. Here, the area of the rectangular parallelepiped 102a in the x-y plane is larger than the area of the intersection region of the square column 101a in the first layer 101 and the square column 103a in the third layer 103.

Likewise, in the fourth layer (additional layer) 104, the sixth layer (additional layer) 106, and the eighth layer (additional layer) 108, each located between the layers containing the square columns, rectangular parallelepipeds 104a, 106a, and 108a made of the first medium in the same shape as the shape of the rectangular parallelepiped 102a are disposed discretely in x-y planes at positions corresponding to the intersections of the square columns in the adjacent layers.

The square columns 101a, 103a, 105a, and 107a in the respective layers are in contact with the rectangular parallelepipeds 102a, 104a, 106a, and 108a in the adjacent layers. In each layer, regions other than the square columns and portions other than the rectangular parallelepipeds are filled in with a second medium (low refractive index). In the present embodiment, the refractive indices of the first and the second media, shapes and intervals of the square columns and the rectangular parallelepipeds, the thickness of each layer, and the like are optimized, such that a complete photonic band gap (wavelength range in which the reflectance is substantially 100% in every direction) in a very wide frequency band (wavelength band) is realized in a desired frequency range (wavelength range).

Figure 2:
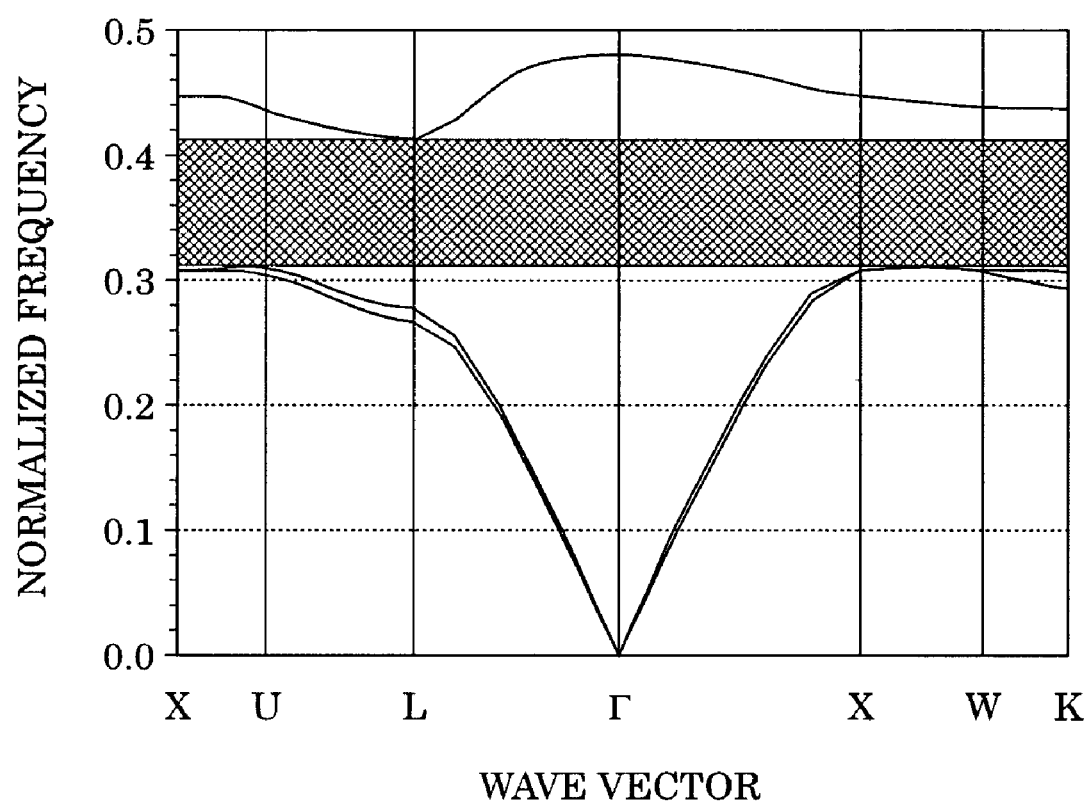
FIG. 2 is an explanatory diagram of a photonic band structure of the first embodiment.

For example, FIG. 2 shows the result of analysis of a photonic band structure by using a plane-wave expansion method, where the refractive index of the first medium is assumed to be 4, the refractive index of the second medium is assumed to be 1, the intervals of the square columns 101a, 103a, 105a, and 107a are assumed to be P, the thickness in the z axis direction of each of the layers 101, 103, 105, and 107 containing the square columns is assumed to be 0.23×P, the thickness in the z axis direction of each of the layers 102, 104, 106, and 108 containing the rectangular parallelepipeds 102a, 104a, 106a, and 108a, respectively, is assumed to be 0.123×P, every column is assumed to be a square column having a section side length W of 0.23×P, and each of the rectangular parallelepipeds 102a, 104a, 106a, and 108a is assumed to be a rectangular parallelepiped having a thickness in the z axis direction of 0.123×P with a square x-y section having each of the side lengths W1 and W2 of 0.48×P. The application of the plane-wave expansion method to a photonic crystal is described in Physical Review Letters, Vol. 65, pp. 3152, 1990.

In the configuration shown in FIG. 1A, rectangular parallelepipeds sandwiched by square columns contained in different layers are disposed at positions corresponding to lattice positions of the diamond lattice. In particular, when the above-described configuration is adopted, the diamond lattice constructed by the rectangular parallelepipeds becomes cubic.

In FIG. 2, the horizontal axis represents a wave vector, that is, an incident direction of an electromagnetic wave incident on the photonic crystal. For example, a point K represents a wave vector parallel to the x axis (or y axis), and a point X represents a wave vector having an inclination of 45° relative to the x axis (or y axis) in an x-y plane. On the other hand, the vertical axis represents a frequency (normalized frequency) normalized by the lattice period. In the normalized frequencies indicated by cross-hatching in FIG. 2, no light can be present regardless of the incident direction of light, and a complete photonic band gap is constructed. In this structure, the complete photonic band gap ratio $\Delta\omega/\omega0$ determined by normalizing the complete photonic band gap (normalized) frequency band width $\Delta\omega$ with the complete photonic band gap (normalized) center frequency $\omega0$ becomes about 0.281.

Figure 3A:
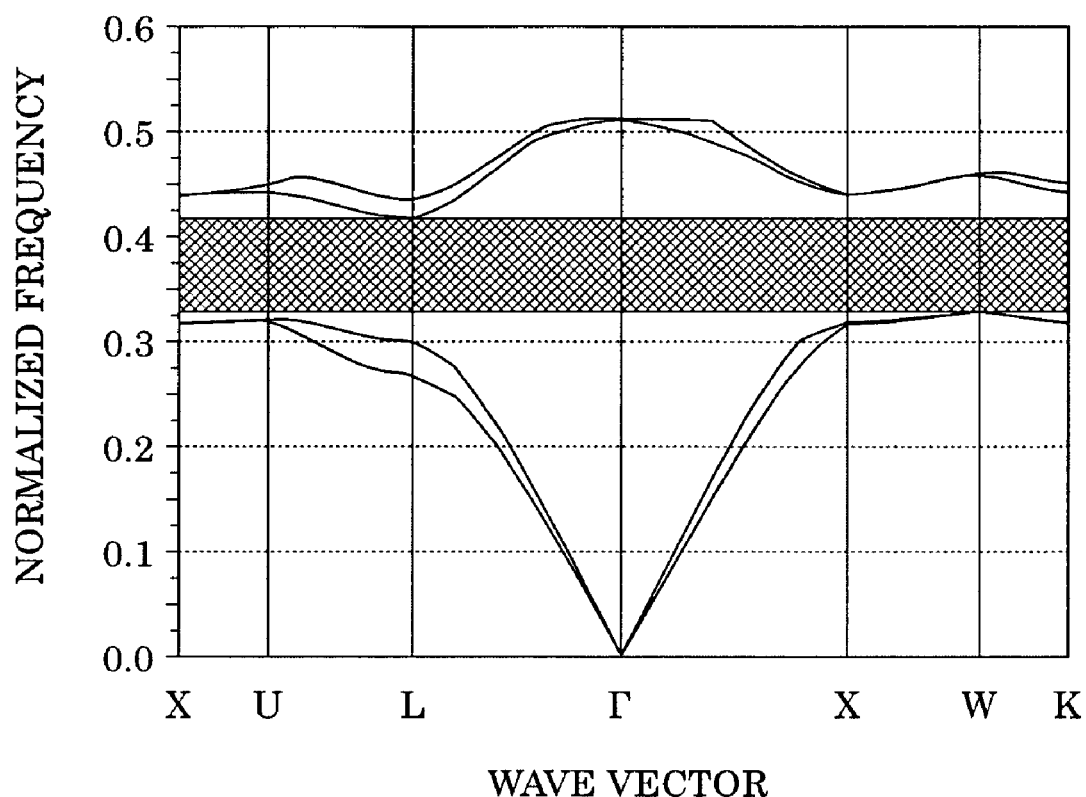
FIGS. 3A to 3C are explanatory diagrams of known photonic band structures.

FIG. 3A shows a photonic band diagram of a woodpile structure including media having the same refractive indices as those in the above-described embodiment (the refractive index of the medium of the square column is 4, and the refractive index of the medium of the portion other than the square column is 1), according to a known technology. In the woodpile structure used for the comparison, the width L1 and the height L2 in the z direction of the square column are specified to be those indicated by Formula 1, where the interval between the square columns in each layer is set at P.

$$L1 = L2 = \frac{\sqrt{2}}{4}P \qquad \text{Formula 1}$$

When L1 and L2 are specified by Formula 1, the positions of intersections of square columns contained in adjacent layers in the woodpile structure are made to correspond to the lattice positions of the diamond opal structure of a cube.

Figure 3B:
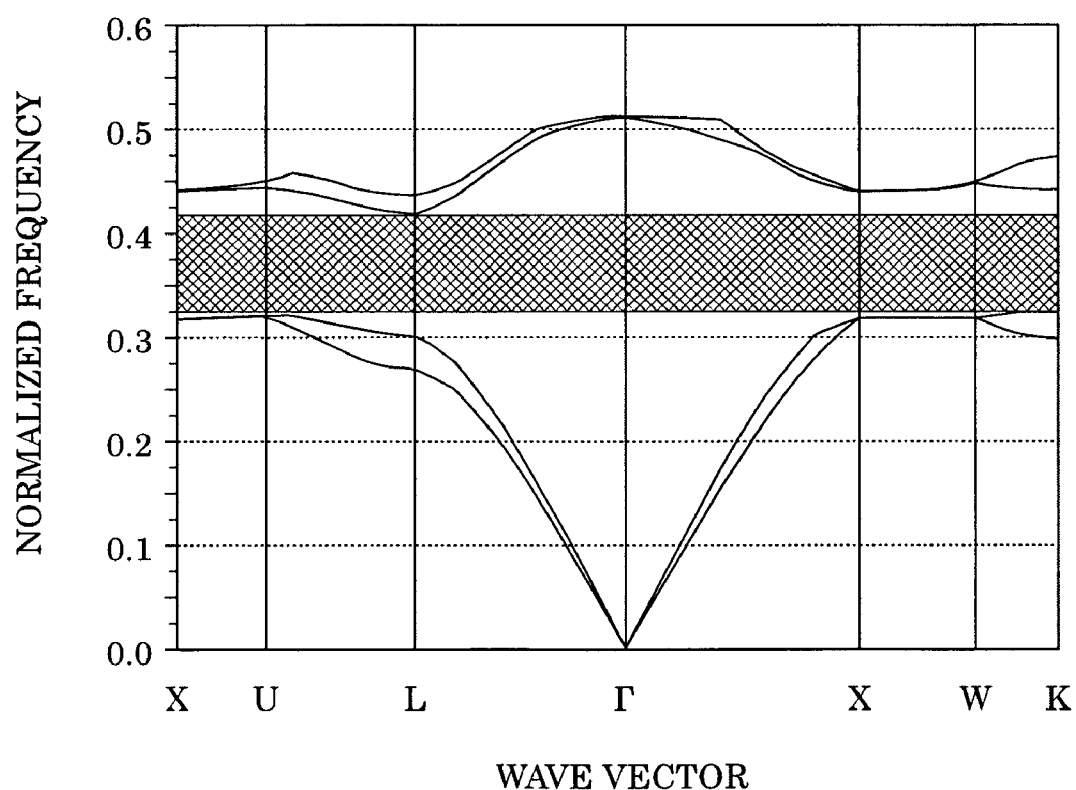

The complete photonic band gap ratio $\Delta\omega/\omega0$ in the photonic band diagram shown in FIG. 3A is about 0.212. Therefore, it is clear that the resulting complete photonic band gap is significantly narrower as compared with that of the structure according to the present invention. FIG. 3B shows a photonic band diagram in the case where L1 and L2 are represented by Formula 2.

$$L1 = 0.25 \times P, L2 = 0.3 \times P \quad \text{Formula 2}$$

When L1 and L2 are specified by Formula 2, the positions of intersections of square columns contained in adjacent layers in the woodpile structure are made to correspond to the lattice positions of the diamond opal structure of a rectangular parallelepiped.

The complete photonic band gap ratio $\Delta\omega/\omega0$ in the photonic band diagram shown in FIG. 3B is 0.263. Therefore, it is clear that the resulting complete photonic band gap is narrower as compared with that of the structure according to the present invention.

Figure 3C:
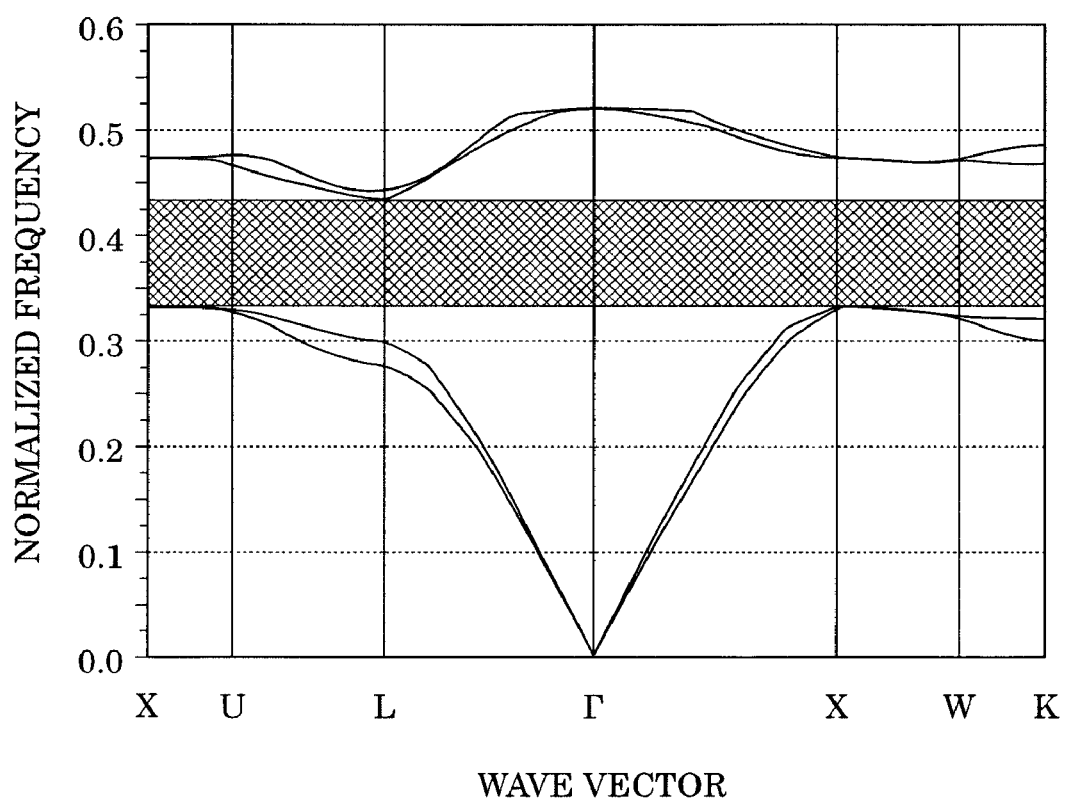

FIG. 3C shows a photonic band diagram of a diamond woodpile structure including media having the same refractive indices as those in the above-described embodiment (the refractive index of the medium of the square column is 4, and the refractive index of the medium of the portion other than the square column is 1), according to a known technology. In the diamond woodpile structure used for the comparison, the width in the x or y direction of every square column is assumed to be 0.28×P, the height in the z direction is assumed to be 0.22×P, and the height in the z direction of a square prism disposed between the square columns and having the same width (0.28×P) as the width of the square column is assumed to be 0.13×P, where the interval between the square columns in each layer is set at P. The complete photonic band gap ratio $\Delta\omega/\omega0$ in the photonic band diagram shown in FIG. 3C is about 0.274. Therefore, it is clear that the resulting complete photonic band gap is narrower as compared with that of the structure according to the present invention.

The reason a wide complete photonic band gap ($\Delta\omega/\omega0 = 0.281$) is realized according to the three-dimensional periodic structure 100 of the present embodiment as compared with the known woodpile structure ($\Delta\omega/\omega0 = 0.263$) and the diamond woodpile structure ($\Delta\omega/\omega0 = 0.274$) will be described below. In the three-dimensional periodic structure 100, layers 102, 104, 106, and 108 containing rectangular parallelepipeds at the positions corresponding to the intersections of the square columns are added, and the rectangular parallelepiped has an area larger than the area of the intersection region of the square columns in an x-y plane. Consequently, structural portions joined in the z direction in FIG. 1A are incorporated into the woodpile structure. Since the rectangular parallelepipeds have areas larger than the areas of the intersection regions of the square columns, portions joined in a slanting direction (for example, a diagonal direction of x-z) are incorporated into the diamond woodpile structure. Consequently, a standing wave which concentrates energy on the first medium and a standing wave which concentrates energy on the second medium tend to become present relative to an electromagnetic wave of a polarized light component exhibiting oscillation of an electric field in the z direction and the slanting direction. Since the degree of concentration of each energy is high, the band range of the complete photonic band gap is increased. As described above, in the present embodiment, the rectangular parallelepipeds having areas larger than the areas of the intersection regions of the square columns are disposed between the square columns and, thereby, the band range of the complete photonic band gap is increased. With respect to an electromagnetic wave of a polarized light component exhibiting oscillation of an electric field in the x direction or the y direction, a wide photonic band gap can be realized as in the known woodpile structure and the diamond woodpile structure. When the additional layer is composed of one layer containing rectangular parallelepipeds, as described above, the shapes of an x-z section and a y-z section are symmetric in order to reduce the direction dependence of the photonic band gap. Therefore, with respect to the shape of the rectangular parallelepiped in an x-y plane, the length in the x axis direction is equal to the length in the y axis direction.

Figure 4:
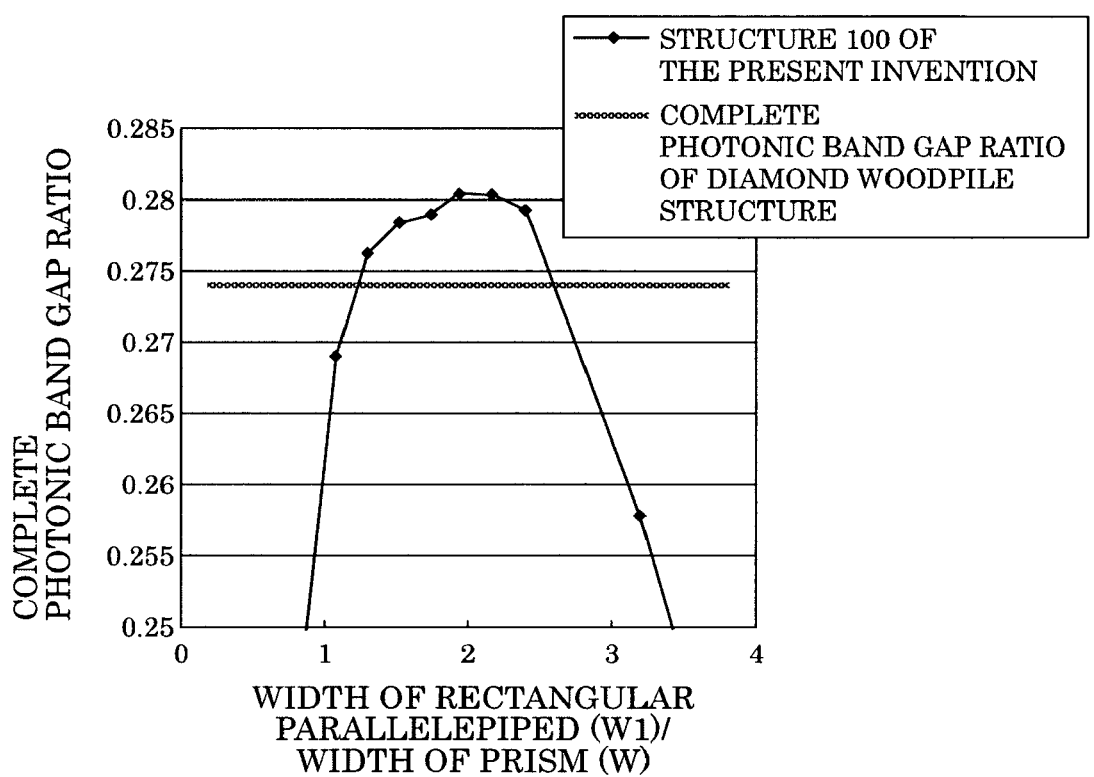
FIG. 4 is a graph showing the complete photonic band gap ratio versus the width of a rectangular parallelepiped divided by the width of a square column in the first embodiment.
Figure 5:
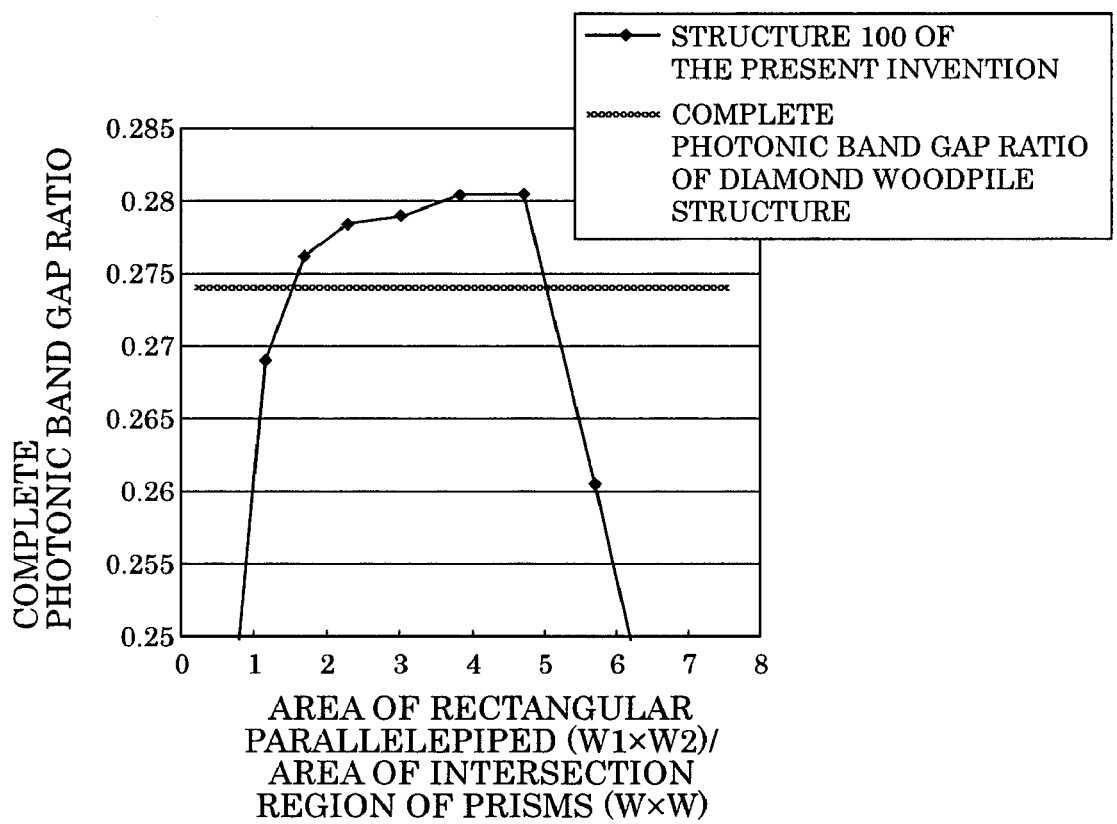
FIG. 5 is a graph showing the complete photonic band gap ratio versus the area of a rectangular parallelepiped divided by the area of an intersection region of square columns in the first embodiment.

FIG. 4 shows the change of the complete photonic band gap ratio with the change of the value W1/W determined by dividing the width of the rectangular parallelepiped in an x-y section by the width of the square column in an x-y section when the width W1 of the rectangular parallelepipeds 102a, 104a, 106a, and 108a in an x-y section and the width W of the square columns 101a, 103a, 105a, and 107a in an x-y section are changed in a similar three-dimensional periodic structure. In FIG. 4, the horizontal axis indicates the value W1/W determined by dividing the width of the rectangular parallelepiped in an x-y section by the width of the square column in an x-y section, and the vertical axis indicates the complete photonic band gap ratio $\Delta\Omega/\Omega0$. In FIG. 4, the complete photonic band gap ratio of a diamond woodpile structure is also shown. As is clear from comparison with the complete photonic band gap ratio of the diamond woodpile structure, when the value of W1/W is specified to be in between 1.21 to 2.53, a performance higher than the performance of the diamond woodpile structure can be realized. This is because when the rectangular parallelepipeds in the additional layer become too large, the degree of concentration of energy on the first and the second media is reduced relative to an electromagnetic wave having an electric field component in the z direction and, as a result, the width of the photonic band gap becomes narrow. In particular, by specifying the value of W1/W at a value in between 1.34 to 2.45, the degree of concentration of energy on the first and the second media can be made more appropriate relative to an electromagnetic wave having an electric field component in the z direction. FIG. 5 shows the change of the complete photonic band gap ratio with the change of the area W1×W2 of an x-y section of the rectangular parallelepiped when the lengths W1 and W2 of the sides of the x-y section of the rectangular parallelepipeds 102a, 104a, 106a, and 108a in all additional layers are changed in a similar three-dimensional periodic structure. In FIG. 5, the horizontal axis indicates the value (W1×W2)/(W×W) determined by dividing the area of an x-y section of the rectangular parallelepiped by the area of the intersection region of square columns, and the vertical axis indicates the complete photonic band gap ratio $\Delta\omega/\omega0$. As is clear from comparison with the complete photonic band gap ratio of the diamond woodpile structure in FIG. 5, when the value (W1×W2)/(W×W) determined by dividing the area of the x-y section of the rectangular parallelepiped by the area of the intersection region of square columns is larger than 1, that is, when the value of W2/W is larger than the value of W/W1, a complete photonic band gap wider than that of the diamond woodpile structure can be realized. Furthermore, similar results can be realized when the area of the intersection region of square columns is changed by changing the W of the square column.

In the above-described three-dimensional periodic structure 100, the refractive index of the first medium is assumed to be 2.33, the refractive index of the second medium is assumed to be 1, the intervals of the square columns 101a, 103a, 105a, and 107a are assumed to be P, the thickness in the z axis direction of each of the layers 101, 103, 105, and 107 containing the square columns is assumed to be 0.25×P, the thickness in the z axis direction of each of the layers 102, 104, 106, and 108 containing the rectangular parallelepipeds 102a, 104a, 106a, and 108a, respectively, is assumed to be 0.10×P, each of the columns 101a, 103a, 105a, and 107a is assumed to be a square column with a rectangular section having one side length W of 0.32×P, and every rectangular parallelepiped is assumed to be a rectangular parallelepiped having a thickness in the z axis direction of 0.10×P with a square x-y section having each of the side lengths W1 and W2 of 0.55×P, and the photonic band structure is analyzed by using the plane-wave expansion method. The resulting complete photonic band gap ratio is 0.080.

When a woodpile structure according to a known technology is formed by using similar media (the refractive index of the square column is 2.33, and the refractive index of the portion other than the square column is 1.0), the complete photonic band gap ratio is 0.059. Therefore, it is clear that the structure according to the present invention exhibits a complete photonic band gap of wide band width compared with that of the woodpile structure even when the ratio of the refractive index of the first medium to the refractive index of the second medium is reduced. In the woodpile structure used for the comparison, the width L1 and the height L2 in the z direction of the square column are assumed to be those represented by Formula 1, where the interval between the square columns in each layer is assumed to be P. Furthermore, when a diamond woodpile structure according to a known technology is formed by using similar media (the refractive index of the square column is 2.33, and the refractive index of the portion other than the square column is 1.0), the complete photonic band gap ratio is 0.065. Therefore, it is clear that the structure according to the present invention exhibits a complete photonic band gap of wide band width compared with that of the diamond woodpile structure even when the ratio of the refractive index of the first medium to the refractive index of the second medium is reduced.

Figure 6:
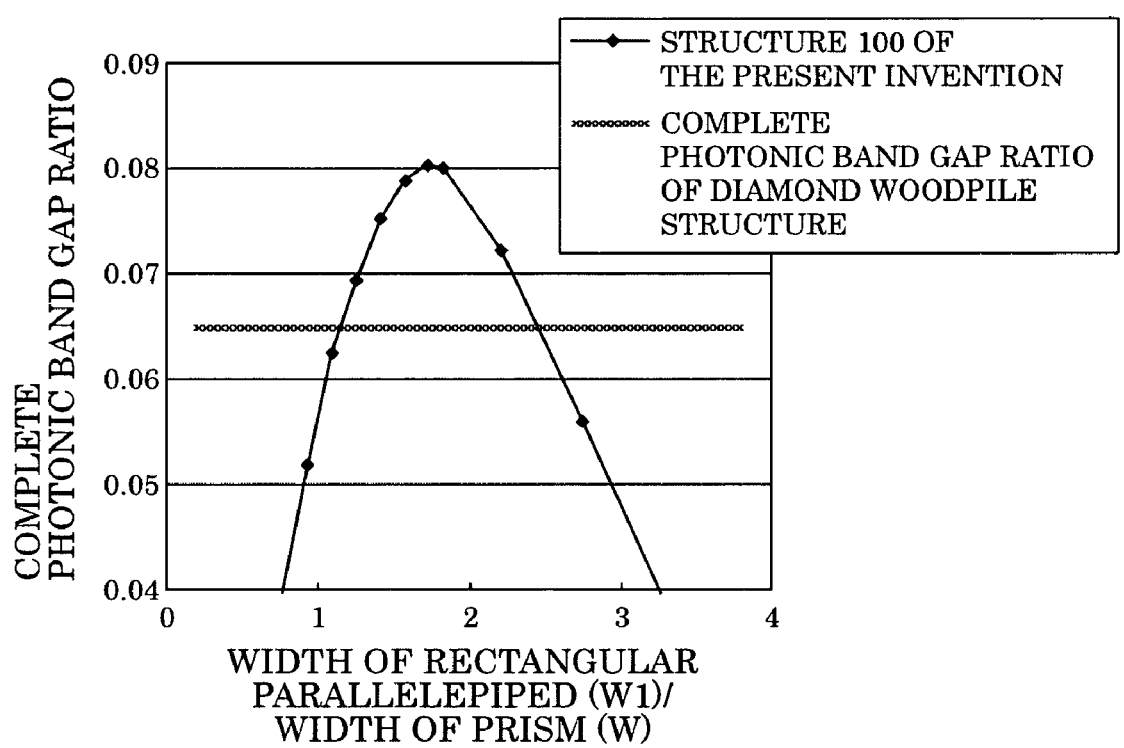
FIG. 6 is a graph showing the complete photonic band gap ratio versus the width of a rectangular parallelepiped divided by the width of a square column in the first embodiment.
Figure 7:
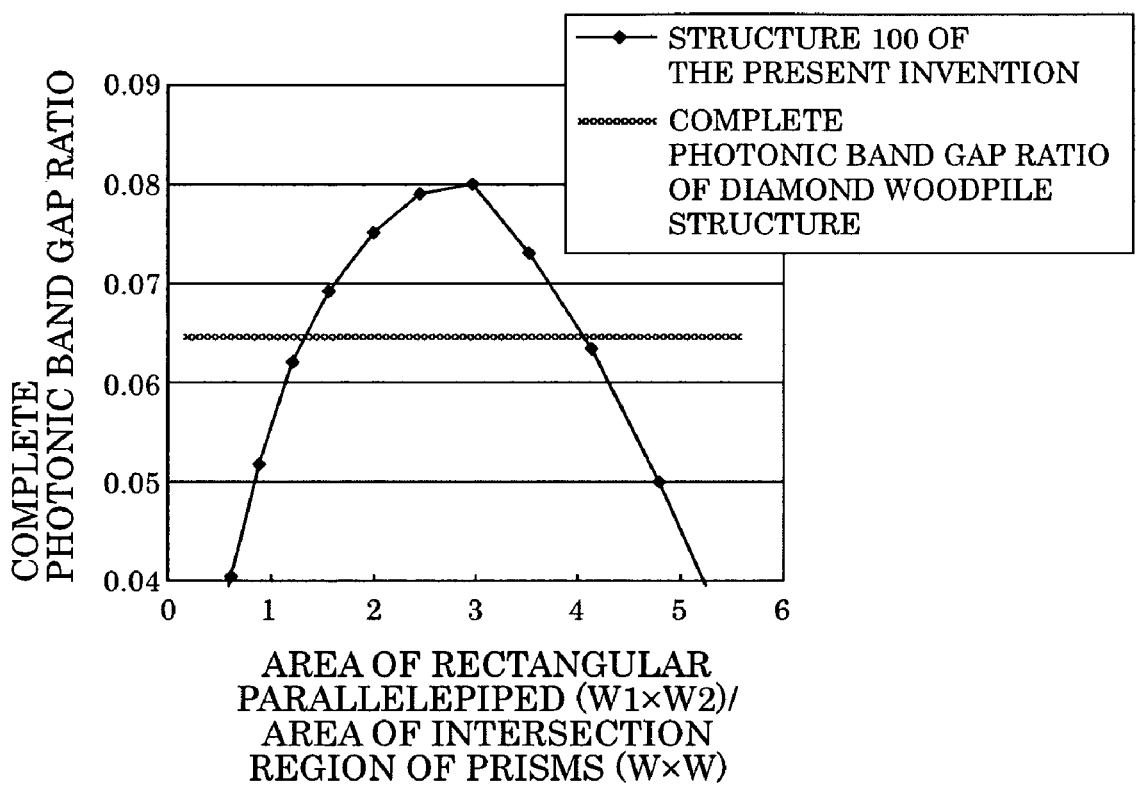
FIG. 7 is a graph showing the complete photonic band gap ratio versus the area of a rectangular parallelepiped divided by the area of an intersection region of square columns in the first embodiment.

FIG. 6 shows the change of the complete photonic band gap ratio with the change of the value W1/W determined by dividing the width in an x-y section of the rectangular parallelepiped by the width in an x-y section of the square column when the width W1 in an x-y section of the rectangular parallelepipeds 102a, 104a, 106a, and 108a and the width W in an x-y section of the square columns 101a, 103a, 105a, and 107a are changed in a similar three-dimensional periodic structure. In FIG. 6, the horizontal axis indicates the value W1/W determined by dividing the width in an x-y section of the rectangular parallelepiped by the width in an x-y section of the square column, and the vertical axis indicates the complete photonic band gap ratio $\Delta\omega/\omega 0$. In FIG. 6, the complete photonic band gap ratio of a diamond woodpile structure is also shown. As is clear from comparison with the complete photonic band gap ratio of the diamond woodpile structure shown in FIG. 6, a high performance can be realized when the value of W1/W is specified to be in between 1.16 to 2.39. In addition, by specifying the value of W1/W at a value in between 1.33 to 2.18, a higher performance can be realized. FIG. 7 shows the change of the complete photonic band gap ratio with the change of the area W1×W2 of an x-y section of the rectangular parallelepiped when the widths W1 and W2 of the x-y section of the rectangular parallelepipeds 102a, 104a, 106a, and 108a in additional layers are changed in a similar three-dimensional periodic structure. In FIG. 7, the horizontal axis indicates the value (W1×W2)/(W×W) determined by dividing the area of an x-y section of the rectangular parallelepiped by the area of the intersection region of square columns, and the vertical axis indicates the complete photonic band gap ratio $\Delta\omega/\omega 0$. In FIG. 7, the complete photonic band gap ratio of a diamond woodpile structure is also shown. As is clear from comparison with the complete photonic band gap ratio of the diamond woodpile structure in FIG. 7, when the value (W1×W2)/(W×W) determined by dividing the area of the x-y section of the rectangular parallelepiped by the area of the intersection region of square columns is larger than 1, that is, when the value of W2/W is larger than the value of W/W1, a complete photonic band gap wider than that of the diamond woodpile structure can be realized in the present embodiment. Furthermore, similar results can be realized when the area of the intersection region of square columns is changed by changing the width W of the square column.

Figure 1A:
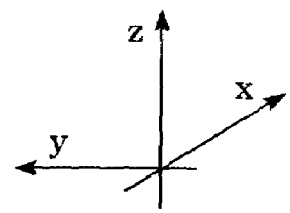

As described above, according to the present embodiment, a complete photonic band gap wider than those of the previously proposed woodpile structure and the diamond woodpile structure can be realized by appropriately adjusting the widths (W1, W2) of an x-y section of the rectangular parallelepiped contained in the additional layer and the width (W) of an x-y section of the square column of the three-dimensional periodic structure. Even when the ratio of the refractive index of the first medium to the refractive index of the second medium is reduced, a complete photonic band gap wider than those of the previously proposed woodpile structure and the diamond woodpile structure can be realized by appropriately adjusting the size of each part in the additional layer of the three-dimensional periodic structure. In the embodiment shown in FIG. 1 and FIG. 2, the rectangular parallelepiped has a structure in which the width W1 is equal to the width W2 in the x-y section. However, a structure in which the widths are different may be adopted. The widths of the square column parallel to the x axis and the square column parallel to the y axis may be set at different values, and the interval between the square columns parallel to the x axis and the interval between the square columns parallel to the y axis may be set at different values. The incident angle dependence and the polarized light dependence of the photonic band gap can be changed by changing the angle between square columns in adjacent layers. In particular, this is useful, for example, to realize a desired performance relative to the light incident at a predetermined angle and to introduce anisotropy in the three-dimensional periodic structure. Conversely, when the square columns intersect at 90° as in the present embodiment, a characteristic exhibiting small incident angle dependence and polarized light dependence can be realized.

Whereas the medium having a refractive index of 4.0 or 2.33 is used as the first medium in the present embodiment, media having other refractive indices may be used. With respect to media used for forming the three-dimensional periodic structure, as in known three-dimensional periodic structures, examples of high refractive index media used for forming square columns and rectangular parallelepiped portions include compound semiconductors, e.g., GaAs, InP, and GaN; semiconductors, e.g., Si; dielectrics, e.g., $TiO_2$;

and metals, and examples of low refractive index media used for filling in portions other than the square columns and rectangular parallelepiped portions include dielectrics, e.g., $SiO_2$; organic polymer materials e.g., PMMA; and air. A refractive index ratio can be set at 2 or more to realize a wide complete photonic band gap, and 2 to 5 is more suitable.

The relationship between the dielectric constant $\in$ and the refractive index n is indicated by the following Formula (where μ represents a magnetic permeability).

$$n=\sqrt{(\in \cdot \mu)} \quad \text{Formula 3}$$

The shift of the disposition pitch of the square columns in the first and fifth layers 101 and 105 and the third and seventh layers 103 and 107 can be set at P/2. The shift of the square columns in the first layer 101 from the square columns in the fifth layer 105 and the shift of the square columns in the third layer 103 from the square columns in the seventh layer 107 can be set at substantially P/2 in the direction of arrangement, for example, at within the range of 0.4P to 0.6P. The same holds true for the following each embodiment.

Second Embodiment

Figure 8A:
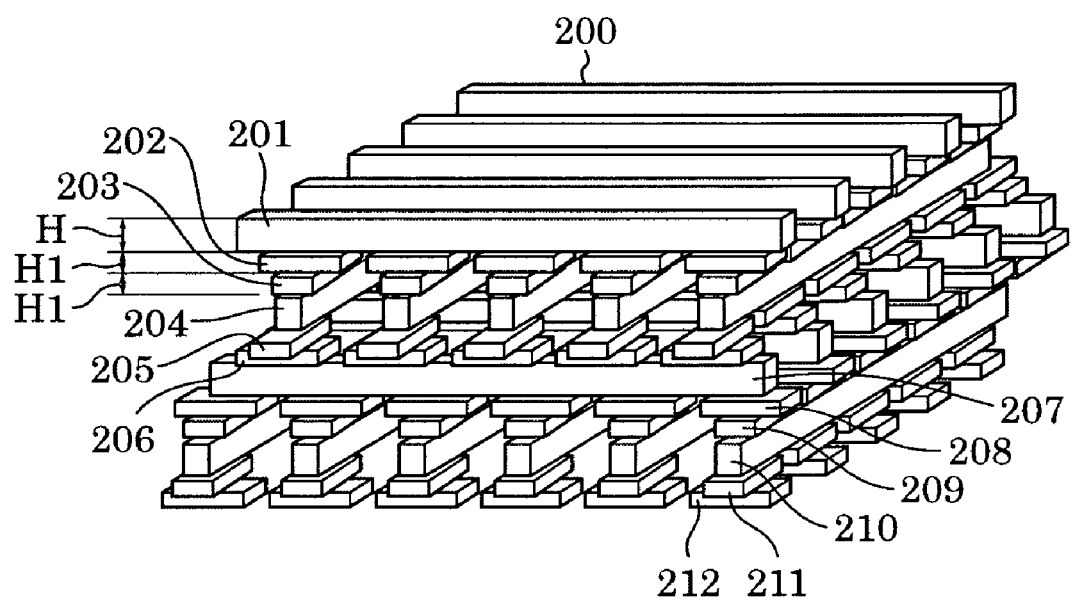
FIG. 8A is a perspective view of a key portion of a second embodiment of the present invention.
Figure 8A:
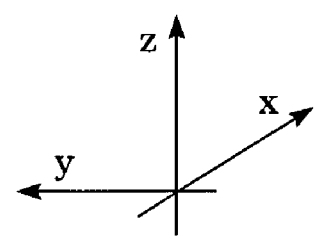
Figure 8B:
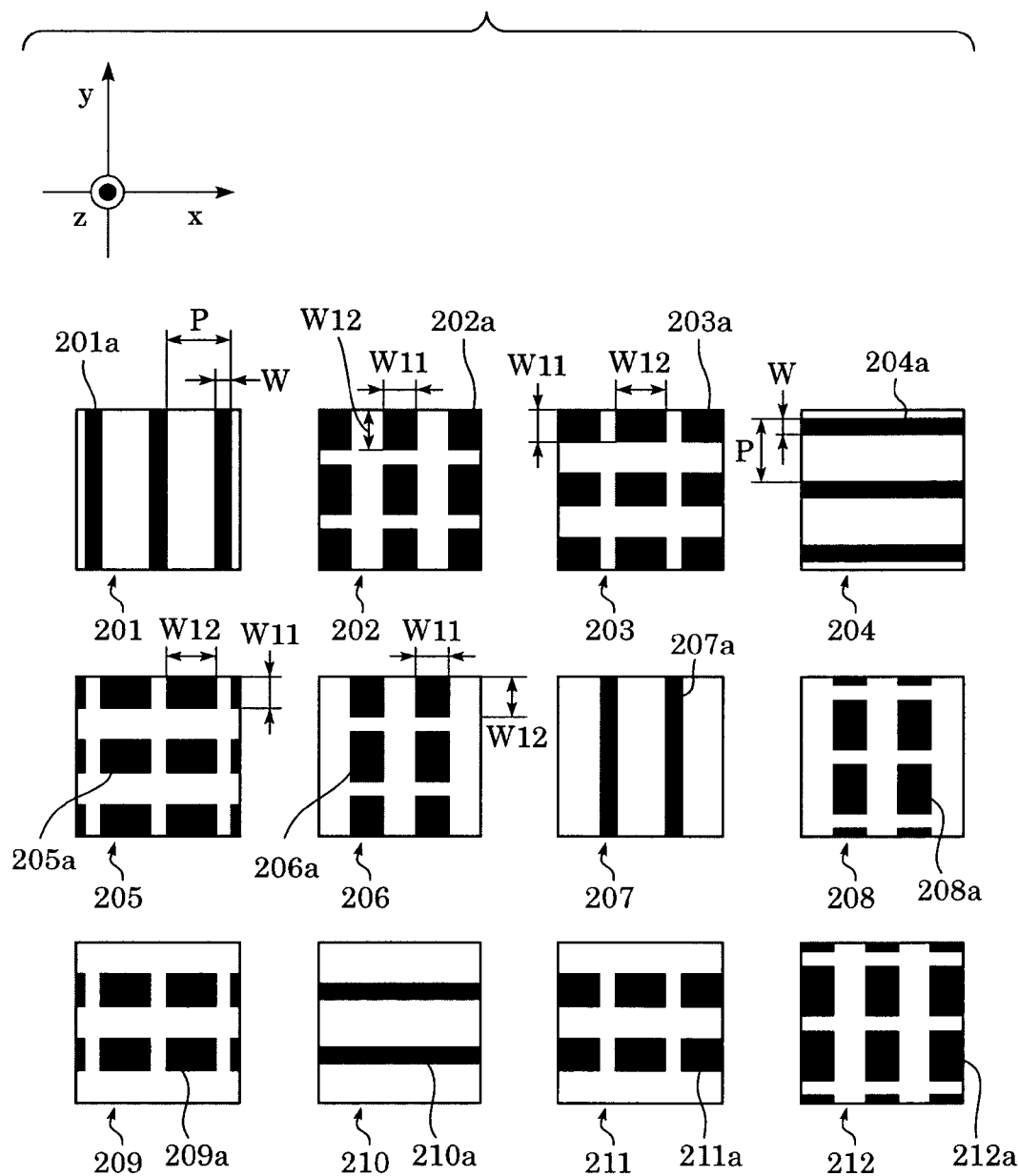
FIG. 8B is an x-y sectional view of each layer shown in FIG. 8A.

FIG. 8A is a perspective view of a key portion of the second embodiment of the three-dimensional periodic structure of the present invention. The three-dimensional periodic structure 200 includes twelve layers composed of layers 201 to 212 in x-y planes as a basic period. FIG. 8B shows a part of an x-y section of each layer. In a first layer 201 and a seventh layer 207, a plurality of square columns 201a and 207a, respectively, made of a first medium extending in the y axis direction are spaced apart by a regular interval P in the x direction, and the square columns 201a and 207a are arranged at positions shifted from each other by P/2 in the x axis direction. In a fourth layer 204 and a tenth layer 210, a plurality of square columns 204a and 210a, respectively, made of the first medium extending in the x axis direction are spaced apart by a regular interval P in the y direction, and the square columns 204a and 210a are arranged at positions shifted from each other by P/2 in the y axis direction. In a second layer 202 and a third layer 203, rectangular parallelepipeds 202a and 203a, respectively, made of the first medium are disposed discretely at positions corresponding to the intersections of the square columns 201a in the first layer 201 and the square columns 204a in the fourth layer 204 such that the rectangular parallelepipeds do not contact with each other in the x-y plane. The rectangular parallelepipeds 202a and the 203a are symmetric and they can coincide with each other by being rotated 90 degrees in an x-y plane. Likewise, in a fifth layer 205, a sixth layer 206, an eighth layer 208, a ninth layer 209, an eleventh layer 211, and a twelfth layer 212 disposed between the layers containing the square columns, rectangular parallelepipeds 205a, 206a, 208a, 209a, 211a, and 212a, respectively, made of the first medium are disposed discretely in x-y planes at positions corresponding to the intersections of the square columns in the adjacent layers. The square columns and the rectangular parallelepipeds in the adjacent layers are in contact with each other. In each layer, regions other than the square columns and the rectangular parallelepipeds are filled in with a second medium. The refractive indices of the first and the second media, shapes and intervals of the square columns and the rectangular parallelepipeds, the thickness of each layer, and the like are optimized and, thereby, a complete photonic band gap of a very wide frequency band (wavelength band) is realized in a desired frequency range (wavelength range).

Figure 9:
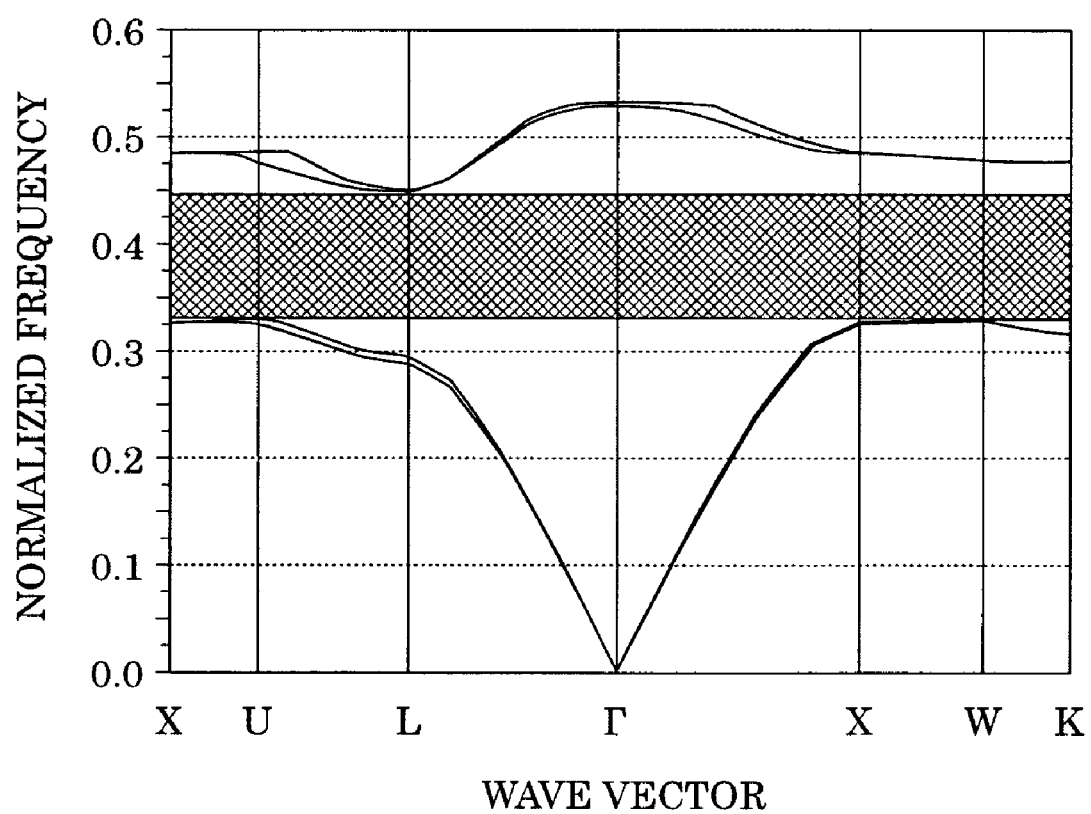
FIG. 9 is an explanatory diagram of a photonic band structure of the second embodiment.

In the present embodiment, for example, FIG. 9 shows the result of analysis of a photonic band structure by using the plane-wave expansion method, where the refractive index of the first medium is assumed to be 4, the refractive index of the second medium is assumed to be 1, the interval of the square columns is assumed to be P, the thickness in the z axis direction of each of the layers 201, 204, 207, and 210 containing the square columns is assumed to be 0.174×P, the thickness in the z axis direction of each of the layers 202, 203, 205, 206, 208, 209, 211, and 212 containing the rectangular parallelepipeds is assumed to be 0.09×P, each of the columns 201a, 204a, 207a, and 210a is assumed to be a square column having a section side length W of 0.174×P, and each of the rectangular parallelepipeds 202a, 203a, 205a, 206a, 208a, 209a, 211a, and 212a is assumed to be a rectangular parallelepiped having a thickness in the z direction of 0.09×P with a rectangular x-y section having the width W11 in the direction perpendicular to the direction of the extension of the adjacent square column of 0.31×P and the width W12 in the direction perpendicular to the direction of the width W11 of 0.655×P.

The complete photonic band gap ratio of this three-dimensional periodic structure is 0.303 and, therefore, a structure exhibiting a complete photonic band gap of a wide bandwidth compared with the woodpile structure and the diamond woodpile structure can be realized for the same reason as in the first embodiment. Since the additional layers are composed of at least two layers containing the rectangular parallelepipeds, as described above, in particular, portions joined in a slanting direction (for example, a diagonal direction of x-z) are incorporated into the diamond woodpile structure. Consequently, a standing wave which concentrates energy on the first medium and a standing wave which concentrates energy on the second medium tend to become present relative to an electromagnetic wave of a polarized light component exhibiting oscillation of an electric field in the slanting direction. Since the degree of concentration of each energy is high, the band range of the complete photonic band gap is very increased compared with that in the case where the additional layer is composed of one layer. When the additional layers are composed of at least two layers, in order to reduce the direction dependence of the photonic band gap, it is desirable that the shapes of an x-z section and a y-z section are symmetric on an additional layer basis. With respect to the shape of each rectangular parallelepiped contained in the additional layer in an x-y plane, the length in the x axis direction and the length in the y axis direction are not necessarily made equal to each other. It is desirable that the two lengths are made to have different values because the flexibility in design is increased and a wider photonic band gap can be realized. In particular, as is shown in the present embodiment, it is more desirable that the length in the x axis direction is made longer than the length in the y axis direction in the shape of the rectangular parallelepiped adjacent to the square column extending in the x axis direction, and the length in the y axis direction is made longer than the length in the x axis direction in the shape of the rectangular parallelepiped adjacent to the square column extending in the y axis direction because a wider photonic band gap can be realized. In this manner, a structure exhibiting a complete photonic band gap wider than that in the first embodiment can be realized according to the present embodiment.

Figure 10:
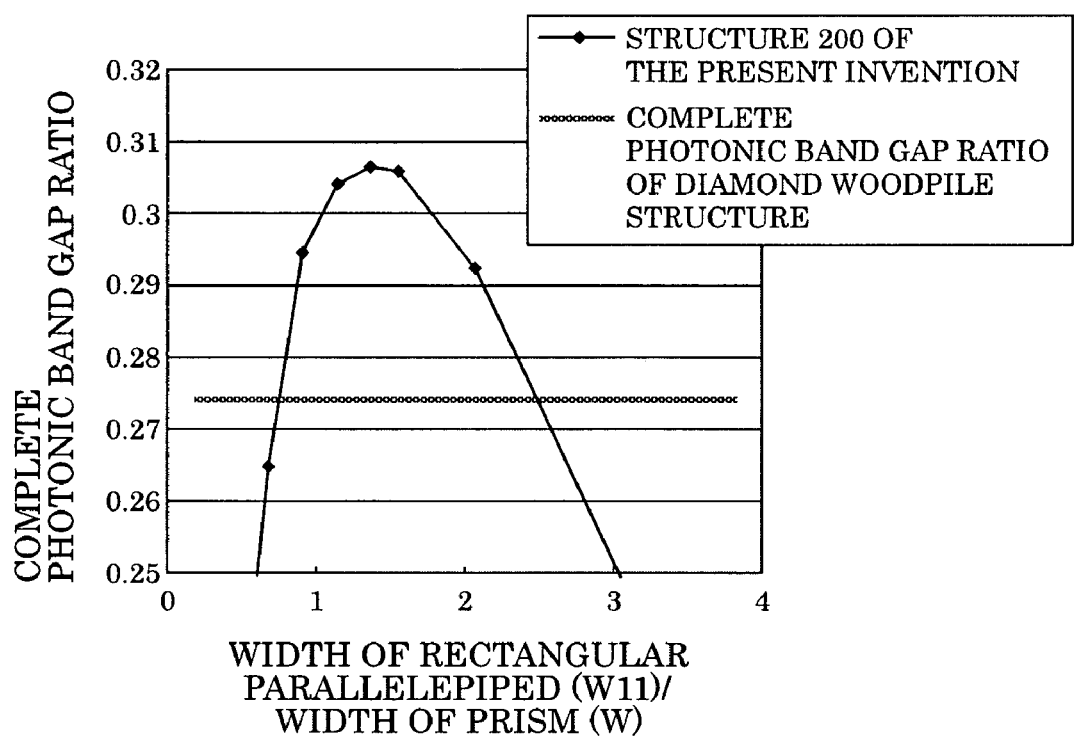
FIG. 10 is a graph showing the complete photonic band gap ratio versus the width of a rectangular parallelepiped divided by the width of a square column in the second embodiment.

FIG. 10 shows the change of the complete photonic band gap ratio with the change of the value W11/W determined by dividing the width in an x-y section of the rectangular parallelepiped by the width in an x-y section of the square column when the width W11 in an x-y section of the rectangular parallelepipeds 202a, 203a, 205a, 206a, 208a, 209a, 211a, and 212a and the width W in an x-y section of the square columns 201a, 204a, 207a, and 210a are changed in a similar three-dimensional periodic structure. In FIG. 10, the horizontal axis indicates the value W11/W determined by dividing the width in an x-y section of the rectangular parallelepiped by the width in an x-y section of the square column, and the vertical axis indicates the complete photonic band gap ratio $\Delta\omega/\omega 0$. In FIG. 10, the complete photonic band gap ratio of a diamond woodpile structure is also shown. In the present embodiment, as is clear from FIG. 10, when the value of W11/W is specified to be in between 0.77 to 2.38, a performance higher than the performance of the diamond woodpile structure can be realized. In addition, by specifying the value of W11/W at a value in between 0.88 to 2.10, further higher performance can be realized.

Figure 11:
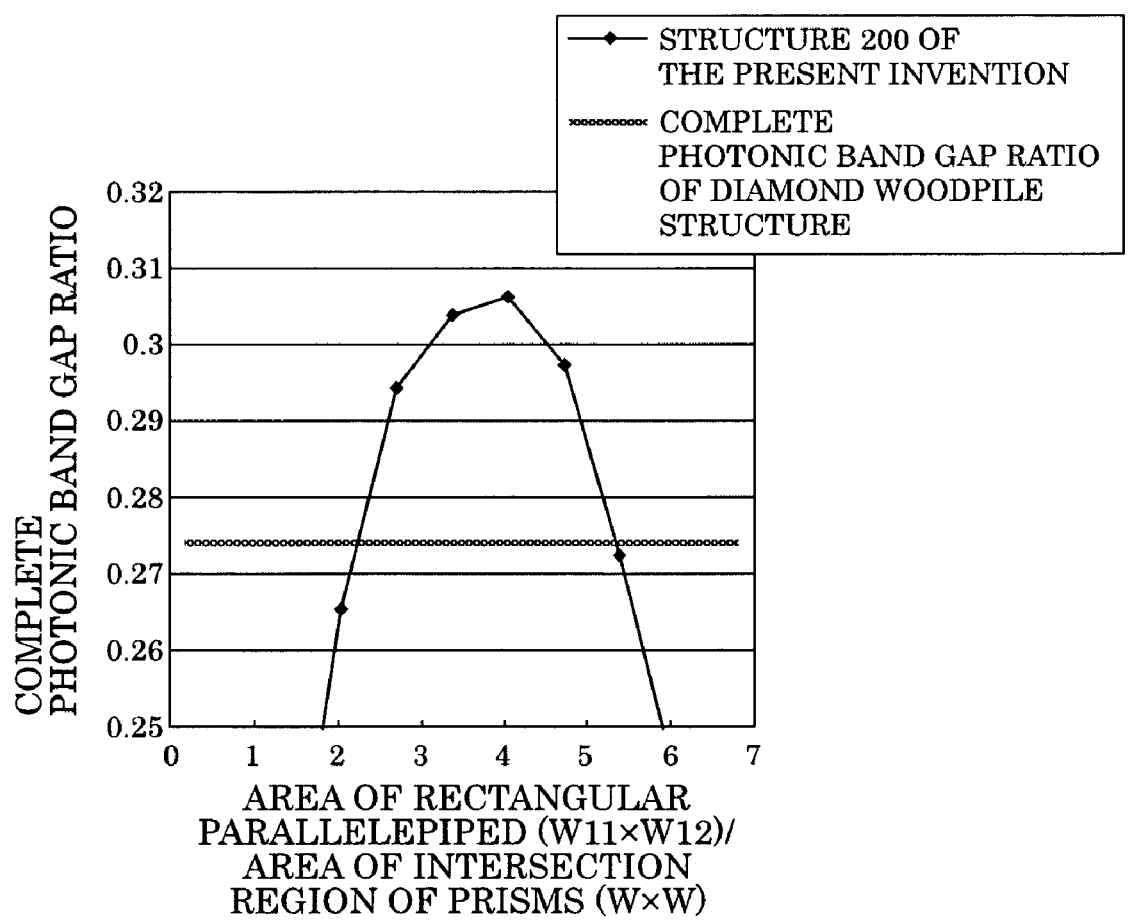
FIG. 11 is a graph showing the complete photonic band gap ratio versus the area of a rectangular parallelepiped divided by the area of an intersection region of square columns in the second embodiment.

FIG. 11 shows the change of the complete photonic band gap ratio with the change of the area of an x-y section of the rectangular parallelepiped when the width W11 of the rectangular parallelepipeds 202a, 203a, 205a, 206a, 208a, 209a, 211a, and 212a in additional layers are changed in a similar three-dimensional periodic structure. In FIG. 11, the horizontal axis indicates the value (W11×W12)/(W×W) determined by dividing the area of an x-y section of the rectangular parallelepiped by the area of the intersection region of square columns, and the vertical axis indicates the complete photonic band gap ratio $\Delta\omega/\omega 0$. In FIG. 11, the complete photonic band gap ratio of a diamond woodpile structure is also shown. In the present embodiment, as is clear from FIG. 11, when the value (W11×W12)/(W×W) determined by dividing the area of the x-y section of the rectangular parallelepiped by the area of the intersection region of square columns is larger than 1, that is, when the value of W12/W is larger than the value of W/W11, a complete photonic band gap wider than that of the diamond woodpile structure can be realized. Furthermore, similar results can be realized when the area of the rectangular parallelepiped in the x-y plane is changed by changing the width W12 of the rectangular parallelepiped in the additional layer and when the area of the intersection region of square columns is changed by changing the width W of the square column.

By adding the rectangular parallelepipeds, the energy distribution is improved particularly in the width direction of the square column while the energy tends to leak into the second medium in that direction, and a standing wave which concentrates energy on the first medium tends to become present relative to an electromagnetic wave of a polarized light component exhibiting oscillation of an electric field in a slanting direction (for example, a diagonal direction of x-z). As a result, a wide complete photonic band gap can be realized. Consequently, the amount of change of the complete photonic band gap with the change of the width W11 parallel to the width direction of the square column, among the widths of the rectangular parallelepiped, is larger than the amount of change with the change of the width W12 perpendicular to the width direction of the square column. The value of the width W12 of the rectangular parallelepiped can be relatively flexibly set as long as the value is larger than or equal to a predetermined value. The factors responsible for limiting the width of each structure are similar to the reasons described in the first embodiment.

In the three-dimensional periodic structure shown in FIG. 8A, the refractive index of the first medium is assumed to be 2.33, the refractive index of the second medium is assumed to be 1.0, the interval of the square columns is assumed to be P, the thickness in the z axis direction of each of the layers 201, 204, 207, and 210 containing the square columns is assumed to be 0.174×P, the thickness in the z direction of each of the layers 202, 203, 205, 206, 208, 209, 211, and 212 containing the rectangular parallelepipeds is assumed to be 0.09×P, each of the columns 201a, 204a, 207a, and 210a is assumed to be a square column having one side width of a section of 0.31×P, and each of the rectangular parallelepipeds 202a, 203a, 205a, 206a, 208a, 209a, 211a, and 212a is assumed to be a rectangular parallelepiped having a thickness in the z direction of 0.09×P with a rectangular x-y section having the width W11 in the direction perpendicular to the direction of the extension of the adjacent square column of 0.37×P and the width W12 in the direction perpendicular to the direction of the width W11 of 0.66×P, and the photonic band structure is analyzed by the plane-wave expansion method. The resulting complete photonic band gap ratio is 0.088. Therefore, a structure exhibiting a wide complete photonic band gap can be realized even when the ratio of the refractive index of the first medium to the refractive index of the second medium is reduced. The reasons are similar to those described above.

Figure 12:
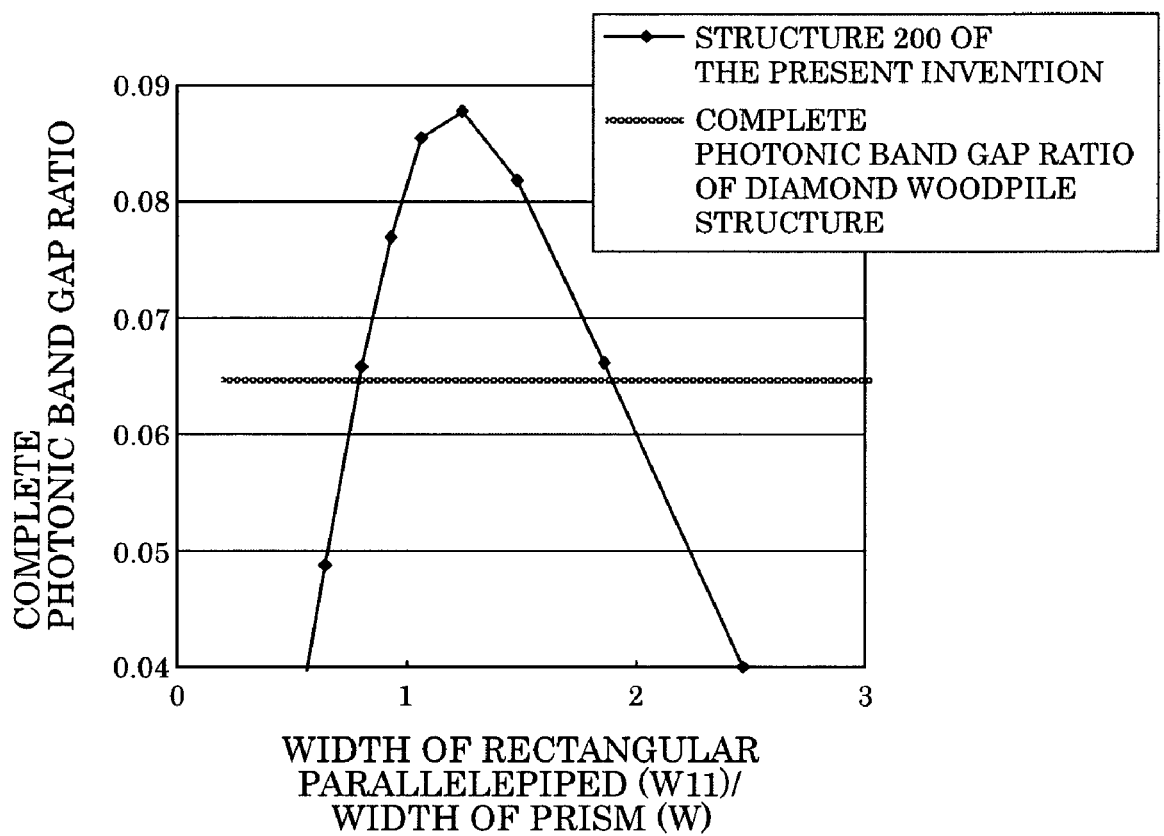
FIG. 12 is a graph showing the complete photonic band gap ratio versus the width of a rectangular parallelepiped divided by the width of a square column in the second embodiment.
Figure 13:
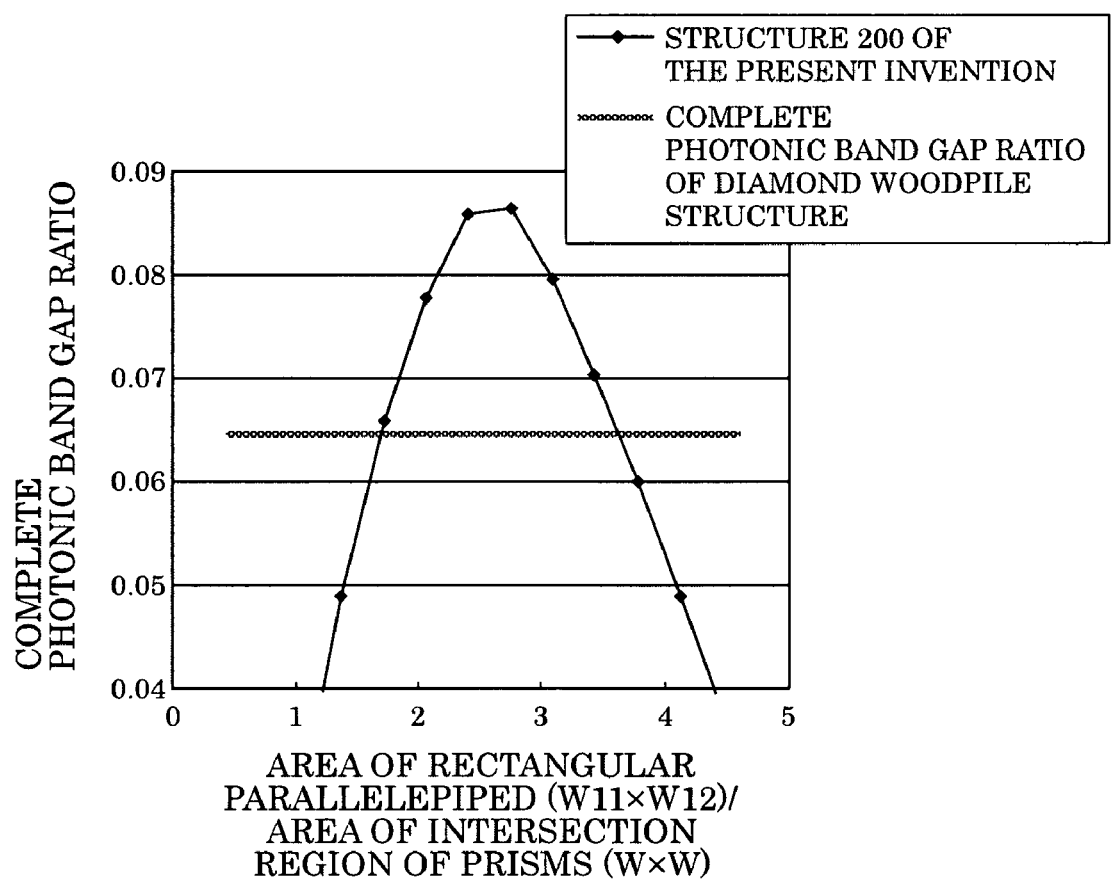
FIG. 13 is a graph showing the complete photonic band gap ratio versus the area of a rectangular parallelepiped divided by the area of an intersection region of square columns in the second embodiment.

Furthermore, FIG. 12 shows the change of the complete photonic band gap ratio with the change of the value W11/W determined by dividing the width in an x-y section of the rectangular parallelepiped by the width in an x-y section of the square column when the width W11 in an x-y section of the rectangular parallelepipeds 202a, 203a, 205a, 206a, 208a, 209a, 211a, and 212a and the width W in an x-y section of the square columns 201a, 204a, 207a, and 210a are changed in a similar three-dimensional periodic structure. In FIG. 12, the horizontal axis indicates the value W11/W determined by dividing the width in an x-y section of the rectangular parallelepiped by the width in an x-y section of the square column, and the vertical axis indicates the complete photonic band gap ratio $\Delta\omega/\omega 0$. In FIG. 12, the complete photonic band gap ratio of a diamond woodpile structure is also shown. In the present embodiment, as is clear from FIG. 12, when the value of W11/W is specified to be in between 0.81 to 1.87, a performance higher than the performance of the diamond woodpile structure can be realized. In addition, by specifying the value of W11/W at a value in between 0.92 to 1.59, further higher performance can be realized. FIG. 13 shows the change of the complete photonic band gap ratio with the change of the area W11×W12 of an x-y section of the rectangular parallelepiped when the width W11 of the rectangular parallelepipeds 202a, 203a, 205a, 206a, 208a, 209a, 211a, and 212a in additional layers are changed in a similar three-dimensional periodic structure. In FIG. 13, the horizontal axis indicates the value (W11×W12)/(W×W) determined by dividing the area of an x-y section of the rectangular parallelepiped by the area of the intersection region of square columns, and the vertical axis indicates the complete photonic band gap ratio $\Delta\omega/\omega 0$. In FIG. 13, the complete photonic band gap ratio of a diamond woodpile structure is also shown. In the present embodiment, as is clear from FIG. 13, when the value (W11×W12)/(W×W) determined by dividing the area of the x-y section of the rectangular parallelepiped by the area of the intersection region of square columns is larger than 1, that is, when the value of W12/W is larger than the value of W/W11, a complete photonic band gap wider than that of the diamond woodpile structure can be realized. Furthermore, similar results can be realized when the area of the rectangular parallelepiped in the x-y plane is changed by changing the width W12 of the rectangular parallelepiped in the additional layer and when the area of the intersection region of square columns is changed by changing the width W of the square column.

As described above, in the present embodiment, a complete photonic band gap wider than those of the previously proposed woodpile structure and the diamond woodpile structure can be realized by appropriately adjusting the widths W11 and W12 of x-y sections of the rectangular parallelepiped 202a, 203a, 205a, 206a, 208a, 209a, 211a, and 212a in the additional layers and the width W of x-y sections of the square column 201a, 204a, 207a, and 210a of the three-dimensional periodic structure. Even when the ratio of the refractive index of the first medium to the refractive index of the second medium is reduced, a complete photonic band gap wider than those of the previously proposed woodpile structure and the diamond woodpile structure can be realized by appropriately adjusting the size of each part in the additional layer of the three-dimensional periodic structure. The factors responsible for limiting the width of each structure are similar to the above-described reasons in the first embodiment. The three-dimensional periodic structure 200 in the present embodiment can exhibit a complete photonic band gap wider than that of the structure in the above-described first embodiment, since the number of additional layers are increased. Furthermore, as in the first embodiment, the square columns, the rectangular parallelepipeds, the directions and intervals of the rectangular parallelepipeds, and refractive indices of constituent media are not limited to those described above. The angle of rotational symmetry of the rectangular parallelepipeds in three additional layers disposed between the layers containing the square columns is not limited to 90 degrees. Furthermore, the rectangular parallelepipeds may not coincide by rotation. The thicknesses of all additional layers may not be equal.

Third Embodiment

Figure 14A:
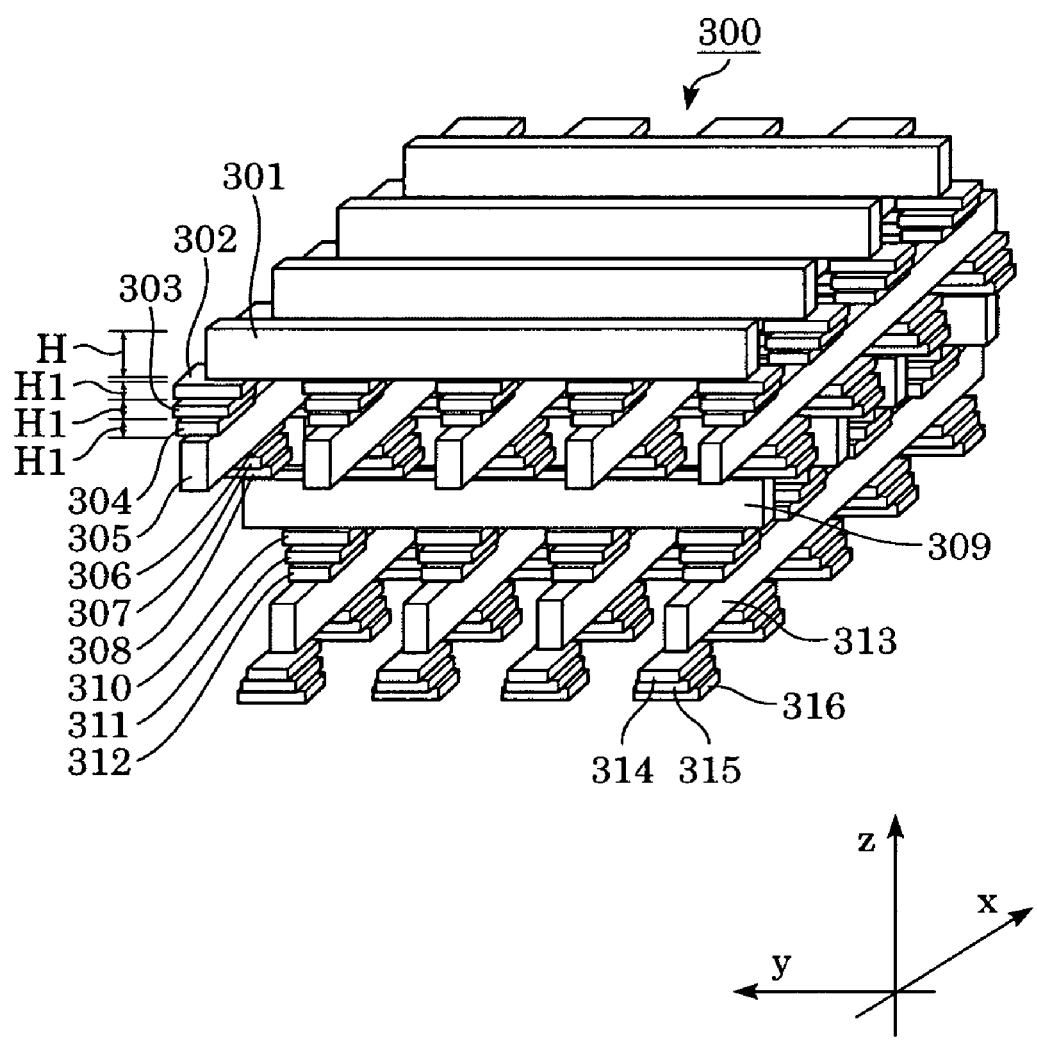
FIG. 14A is a perspective view of a key portion of a third embodiment of the present invention.
Figure 14B:
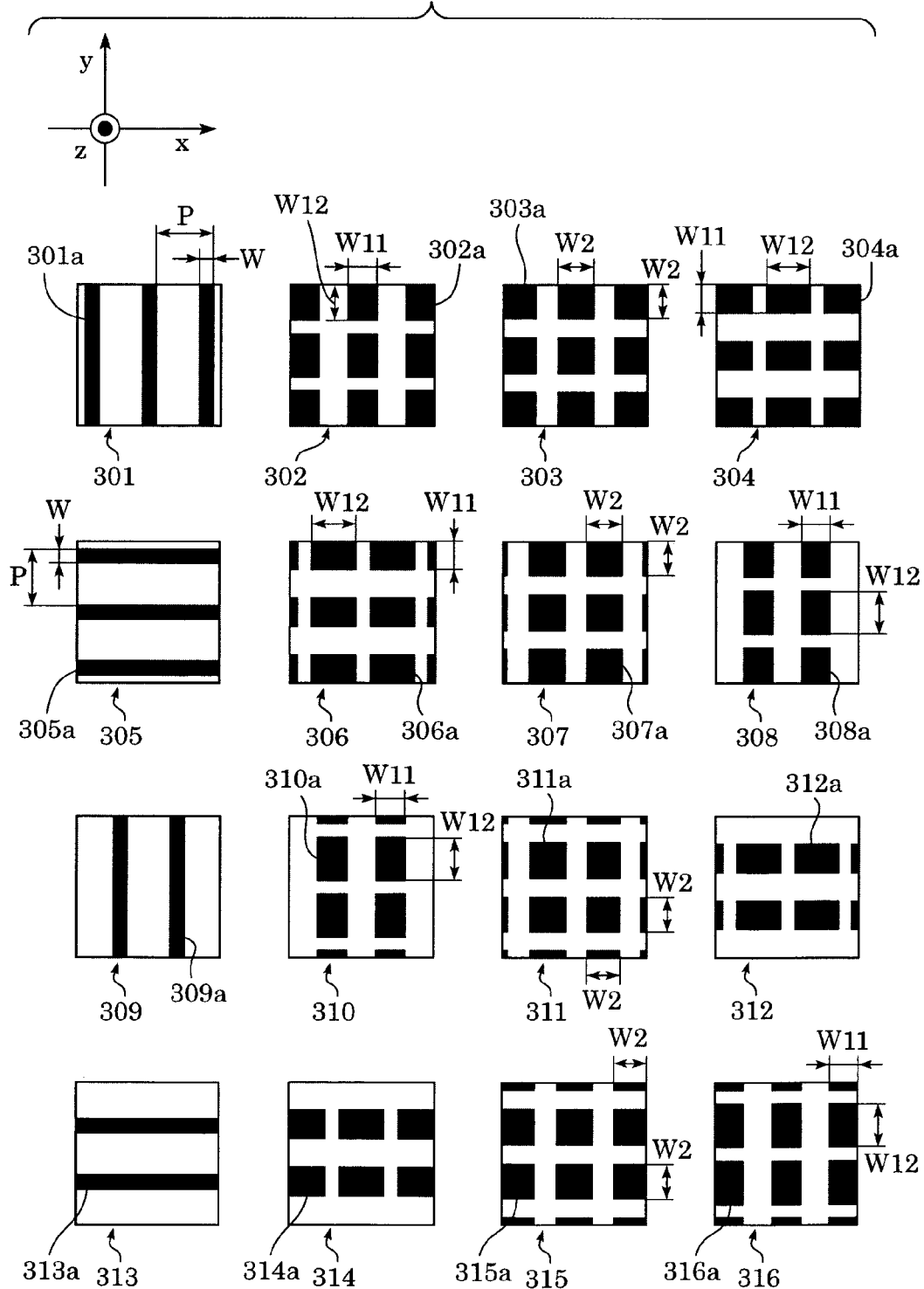
FIG. 14B is an x-y sectional view of each layer shown in FIG. 14A.

FIG. 14A is a perspective view of a key portion of the third embodiment of the three-dimensional periodic structure of the present invention. The three-dimensional periodic structure 300 includes sixteen layers composed of layers 301 to 316 in x-y planes as a basic period. FIG. 14B shows a part of an x-y section of each layer. In a first layer 301 and a ninth layer 309, a plurality of square columns 301a and 309a, respectively, made of a first medium extending in the y axis direction are spaced at regular intervals P in the x direction, and the square columns 301a and 309a are arranged at positions shifted from each other by P/2 in the x axis direction.

In a fifth layer 305 and a thirteenth layer 313, a plurality of square columns 305a and 313a, respectively, made of the first medium extending in the x axis direction are spaced at regular intervals P in the y direction, and the square columns 305a and 313a are arranged at positions shifted from each other by P/2 in the y axis direction. In a second layer 302, a third layer 303, and a fourth layer 304, rectangular parallelepipeds 302a, 303a, and 304a, respectively, made of the first medium are disposed discretely at positions corresponding to the intersections of the square columns 301a in the first layer 301 and the square columns 305a in the fifth layer 305 such that the rectangular parallelepipeds do not contact with each other in the x-y plane.

The rectangular parallelepipeds 302a and the 304a are symmetric and they can coincide with each other by being rotated 90 degrees in an x-y plane. Likewise, in a sixth layer 306, a seventh layer 307, an eighth layer 308, a tenth layer 310, an eleventh layer 311, a twelfth layer 312, a fourteenth layer 314, a fifteenth layer 315, and a sixteenth layer 316 disposed between the layers containing the square columns, rectangular parallelepipeds 306a, 307a, 308a, 310a, 311a, 312a, 314a, 315a, and 316a made of the first medium are disposed discretely in x-y planes at positions corresponding to the intersections of the square columns in the adjacent layers. The square columns and the rectangular parallelepipeds in the adjacent layers are in contact with each other. In each layer, regions other than the square columns and the rectangular parallelepipeds are filled in with a second medium. The refractive indices of the first and the second media, shapes and intervals of the square columns and the rectangular parallelepipeds, the thickness of each layer, and the like are optimized and, thereby, a complete photonic band gap of a very wide frequency band (wavelength band) can be realized in a desired frequency range (wavelength range).

Figure 15:
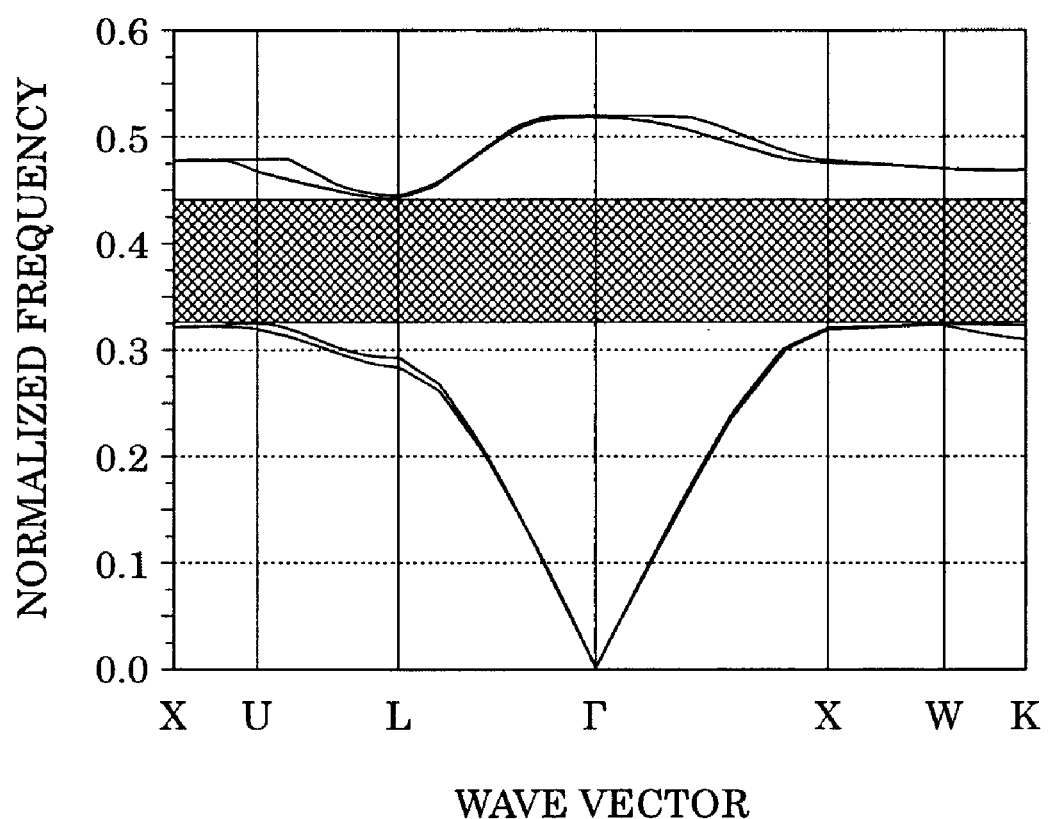
FIG. 15 is an explanatory diagram of a photonic band structure of the third embodiment.

For example, FIG. 15 shows the result of analysis of a photonic band structure by using the plane-wave expansion method, where the refractive index of the first medium is assumed to be 4, the refractive index of the second medium is assumed to be 1, the interval of the square columns is assumed to be P, the thickness in the z axis direction of each of the layers 301, 305, 309, and 313 containing the square columns is assumed to be 0.174×P, the thickness in the z direction of each of the layers 302, 303, 304, 306, 307, 308, 310, 311, 312, 314, 315, and 316 containing the rectangular parallelepipeds is assumed to be 0.06×P, each of the columns 301a, 305a, 309a, and 313a is assumed to be a square column having a section side length of 0.174×P in the z direction and a length W of 0.22×P in the x or y direction, rectangular parallelepipeds 302a, 304a, 306a, 308a, 310a, 312a, 314a, and 316a are assumed to be a rectangular parallelepiped having a thickness in the z direction of 0.06×P with a rectangular x-y section having the length W11 in the direction perpendicular to the direction of the extension of the adjacent square column of 0.28×P and the length W12 in the direction perpendicular to the direction of the W11 of 0.66×P, and rectangular parallelepiped 303a, 307a, 311a, and 315a are assumed to be a rectangular parallelepiped having a thickness in the z direction of 0.06×P with a square x-y section having a side length of 0.43×P. The complete photonic band gap ratio of this structure is 0.307 and, therefore, a structure exhibiting a complete photonic band gap of wide band width compared with those of the woodpile structure and the diamond woodpile structure can be realized for the same reason as in the second embodiment. According to the present embodiment, a structure exhibiting a complete photonic band gap of wider band range compared with those in the first embodiment and the second embodiment can be realized.

As described above, layers containing the rectangular parallelepipeds disposed discretely are provided between the layers containing square columns parallel spaced at an interval and, thereby, a complete photonic band gap wider than that in the known structure can be realized.

Figure 16:
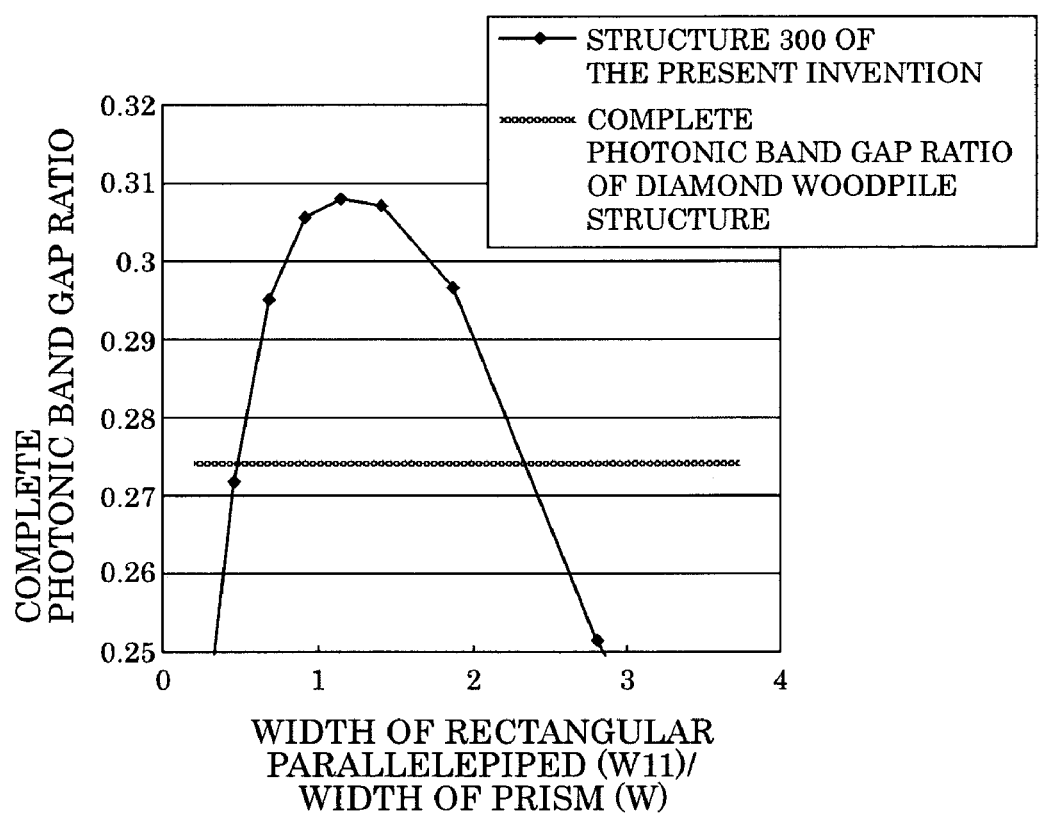
FIG. 16 is a graph showing the complete photonic band gap ratio versus the width of a rectangular parallelepiped divided by the width of a square column in the third embodiment.
Figure 17:
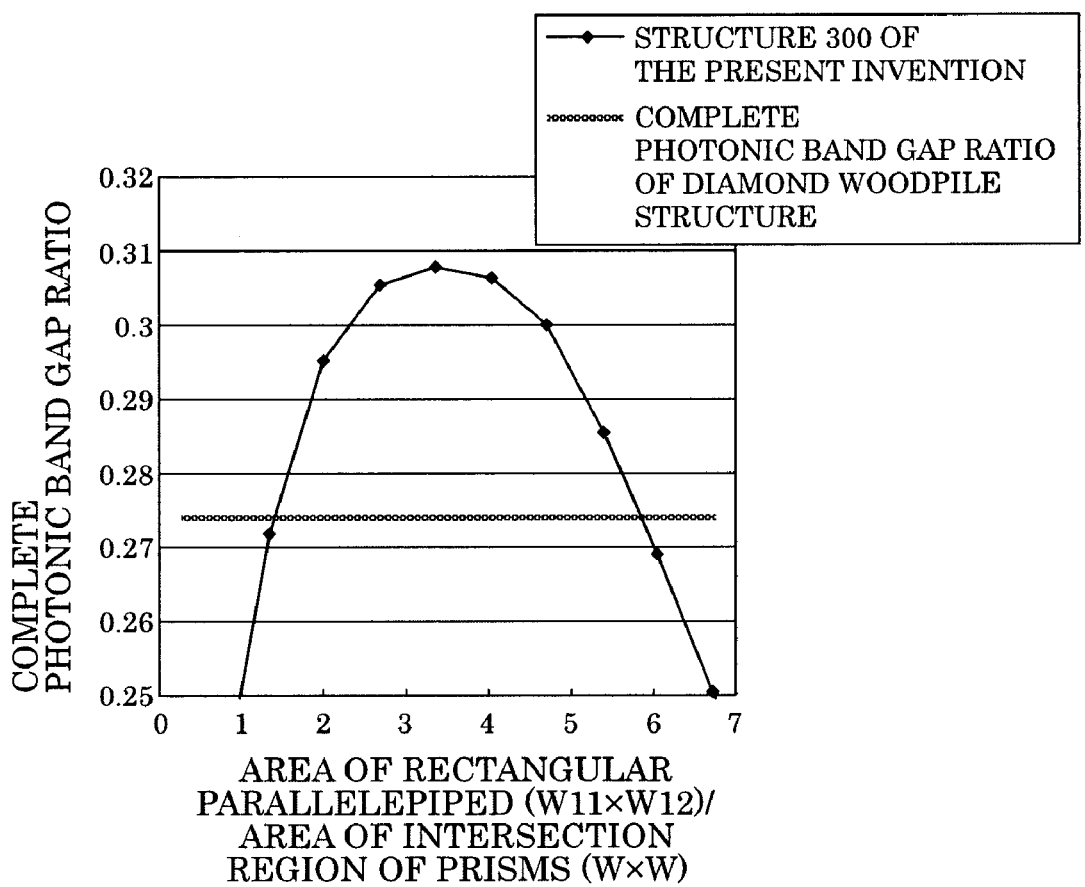
FIG. 17 is a graph showing the complete photonic band gap ratio versus the area of a rectangular parallelepiped divided by the area of an intersection region of square columns in the third embodiment.

Furthermore, FIG. 16 shows the change of the complete photonic band gap ratio with the change of the value W11/W determined by dividing the width in an x-y section of the rectangular parallelepiped by the width in an x-y section of the square column when the width W11 in x-y sections of the rectangular parallelepipeds 302a, 304a, 306a, 308a, 310a, 312a, 314a, and 316a and the width W in an x-y section of the square column are changed in a similar three-dimensional periodic structure. In FIG. 16, the horizontal axis indicates the value W11/W determined by dividing the width in an x-y section of the rectangular parallelepiped by the width in an x-y section of the square column, and the vertical axis indicates the complete photonic band gap ratio $\Delta\omega/\omega 0$. In FIG. 16, the complete photonic band gap ratio of a diamond woodpile structure is also shown. In the present embodiment, as is clear from FIG. 16, when the value of W11/W is specified to be in between 0.45 to 2.15, a performance higher than the performance of the diamond woodpile structure can be realized. In addition, by specifying the value of W11/W at a value in between 0.64 to 1.95, further higher performance can be realized. FIG. 17 shows the change of the complete photonic band gap ratio with the change of the area W11×W12 of the rectangular parallelepiped in an x-y plane when the length W11 of the rectangular parallelepipeds 302a, 304a, 306a, 308a, 310a, 312a, 314a, and 316a in additional layers are changed in a similar three-dimensional periodic structure. In FIG. 17, the horizontal axis indicates the value (W11×W12)/(W×W) determined by dividing the area of an x-y section of the rectangular parallelepiped by the area of the intersection region of square columns, and the vertical axis indicates the complete photonic band gap ratio $\Delta\omega/\omega 0$. In FIG. 17, the complete photonic band gap ratio of a diamond woodpile structure is also shown. In the present embodiment, as is clear from FIG. 17, when the value (W11×W12)/(W×W) determined by dividing the area of the x-y section of the rectangular parallelepiped by the area of the intersection region of square columns is larger than 1, that is, when the value of W12/W is larger than the value of W/W11, a complete photonic band gap wider than that of the diamond woodpile structure can be realized. The above-described diamond woodpile structure is adopted as the diamond woodpile structure used for the comparison. Furthermore, similar results can be realized when the area of the rectangular parallelepiped in the x-y plane is changed by changing the width W12 of the rectangular parallelepiped in the additional layer and when the area of the intersection region of square columns is changed by changing the width W of the square column. The width W12 of the rectangular parallelepiped can be relatively flexibly selected. The factors therefor are similar to the reasons described in the second embodiment. The factors responsible for limiting the width of each structure are similar to the reasons described in the first embodiment.

As described above, in the present embodiment, a complete photonic band gap wider than those of the previously proposed woodpile structure and the diamond woodpile structure can be realized by appropriately adjusting the widths W11 and W12 of x-y sections of the rectangular parallelepiped 302a, 304a, 306a, 308a, 310a, 312a, 314a, and 316a and the width W of x-y sections of the square columns. The factors responsible for limiting the width of each structure are similar to the above-described reasons in the first embodiment. The three-dimensional periodic structure 300 in the present embodiment can exhibit a complete photonic band gap wider than those of the structures in the above-described first and second embodiments, since the number of additional layers are increased. As in the first embodiment, the square columns, the rectangular parallelepipeds, the directions and the intervals of the square columns, and refractive indices of constituent media are not limited to those described above. The angle of rotational symmetry of the rectangular parallelepipeds in three additional layers disposed between the layers containing the square columns is not limited to 90 degrees. Furthermore, the rectangular parallelepipeds may not coincide by rotation. The three rectangular parallelepipeds in the additional layer disposed between the layers containing the square columns may have different areas in the x-y plane. For example, the additional layer may be composed of three layers containing rectangular parallelepipeds having areas changing sequentially in the z direction. In order to realize a wider complete photonic band gap, it is better that layers containing the rectangular parallelepipeds are at least four layers. However, the formation process is complicated. Therefore, the structure may be selected in accordance with the purpose.

Fourth Embodiment

Figure 18A:
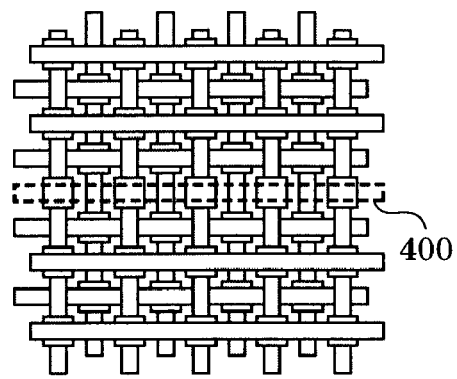
FIGS. 18A and 18B are perspective views of key portions of a fourth embodiment.
Figure 18B:
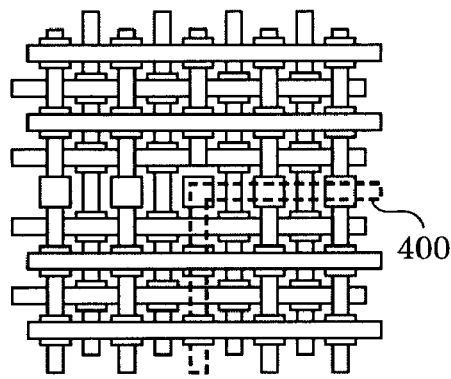

The fourth embodiment related to a functional element including the three-dimensional periodic structure of the present invention will be described with reference to FIGS. 18A and 18B. FIGS. 18A and 18B are sectional views of waveguides 400, wherein linear defects are disposed in the periodic structures of the present invention. In the present embodiment, by providing the linear defect, a state in which an electromagnetic wave can be present in only the defect portion can be brought about relative to the electromagnetic wave in a wavelength range that is a part of the wavelength range in the photonic band gap of the periodic structure. Consequently, a waveguide capable of realizing a sharp bending angle with low loss is constructed. FIG. 18A is a sectional view of a functional element in which the square columns are removed from a predetermined region of the three-dimensional periodic structure of the present invention to construct a straight-line shaped waveguide. FIG. 18B is a sectional view of a functional element in which the square columns and the rectangular parallelepipeds are removed from a predetermined region of the three-dimensional periodic structure of the present invention to construct a curved waveguide.

The linear defect is formed by removing or shifting the location of the square column portions, the rectangular parallelepiped portions, or both structure portions in order that the waveguide has a desired performance, e.g., a waveguide wavelength range. Since the periodic structure portion serving as a base has a wide photonic band gap range, a waveguide which is operated in a wavelength band wider than that of the waveguide having a known structure can be thereby realized.

Figure 19:
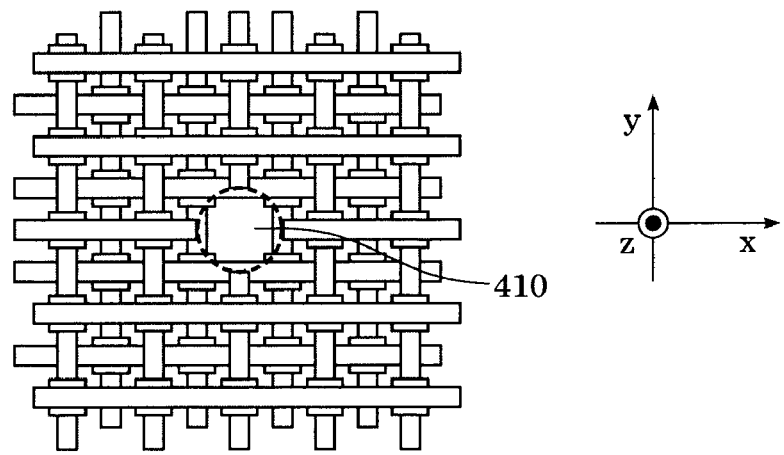
FIG. 19 is a perspective view of a key portion of the fourth embodiment of the present invention.
Figure 21A:
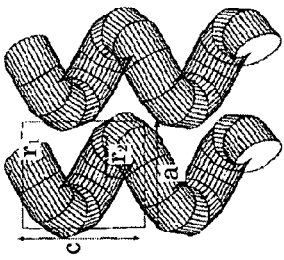
FIGS. 21A to 21F are perspective view of three-dimensional periodic structures exhibiting photonic band gaps.
Figure 21B:
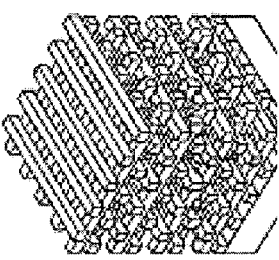
Figure 21D:
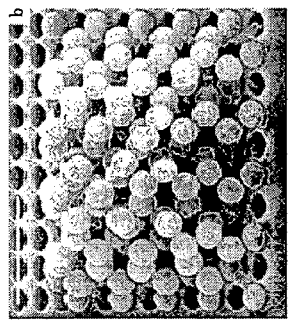
Figure 21C:
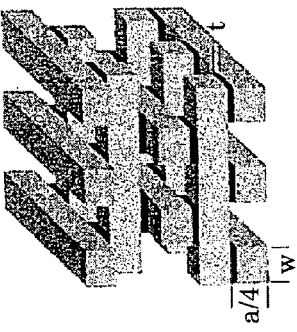
Figure 21E:
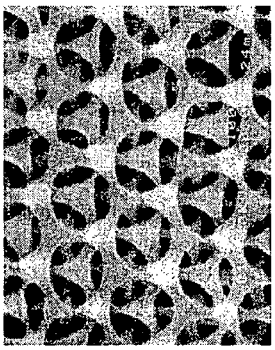
Figure 21F:
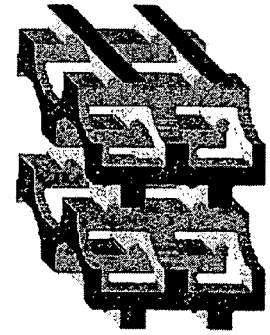

FIG. 19 is a sectional view of a resonator 410 in which a point defect is provided in the three-dimensional periodic structure of the present invention. In FIG. 19, by providing the point defect, a state in which an electromagnetic wave can be present in only the defect portion can be brought about relative to the electromagnetic wave in a wavelength range that is a part of the wavelength range in the photonic band gap of the three-dimensional periodic structure. Consequently, a high-performance resonator capable of confining the electromagnetic wave in a very small region and exhibiting a high confining effect is constructed. By using this resonator, for example, a wavelength selection filter to take out an electromagnetic wave in a very narrow wavelength range corresponding to the resonant wavelength of the resonator from the incident light is realized. The point defect is formed by removing or shifting the location of the square column portions, the rectangular parallelepiped portions, or both structure portions in order that the resonator has a desired performance, e.g., a selection wavelength. Since the three-dimensional periodic structure portion serving as a base has a wide photonic band gap range, a resonator which is operated in a wavelength band wider than that of the resonator having a known structure is thereby realized.

In the present embodiment, the resonator shown in FIG. 19 is filled in with an active medium, energy is supplied by an electromagnetic wave or a current from the outside of the resonator and, thereby, very high-efficiency light-emitting devices, e.g., lasers and LEDs, are realized. Various materials, e.g., compound semiconductors, inorganic light-emitting materials, organic light-emitting materials, polymer light-emitting materials, quantum dots, and nanocrystals, can be used as the active medium. For example, the light-emitting device can be used as a light source for optical communication by bringing the resonant wavelength of the above-described resonator into correspondence with an infrared optical communication spectrum band (800 nm to 1,800 nm). By bringing the resonator into correspondence with the primary colors of light, red (R), green (G), and blue (B), the light-emitting device can be used as light sources for image display devices, and be used as pickup light sources for optical disks, e.g., CDs and DVDs. Furthermore, high-performance microcircuits can be realized by combining various functional elements, e.g., the waveguides shown in FIGS. 18A and 18B, the resonator shown in FIG. 19, light-emitting devices, and polarizing elements through the use of dispersion abnormality in the photonic band. In the embodiments shown in FIG. 18A, FIG. 18B, and FIG. 19, the three-dimensional periodic structure shown in FIGS. 1A and 1B is used as a basic structure. However, the structure shown in FIGS. 8A and 8B or the structure shown in FIGS. 14A and 14B may be used.

As described above, in each embodiment, layers containing the rectangular parallelepipeds disposed discretely are provided between the layers containing square columns parallel spaced at an interval and, thereby, a complete photonic band gap wider than that in the known structure can be realized. Consequently, a functional element which is operated in a wider wavelength band is realized by constructing the functional element including the three-dimensional periodic structure of the present invention.

Fifth Embodiment

A method for producing a three-dimensional periodic structure of the present invention will be described below with reference to FIGS. 20A to 20K. Although a method for producing the three-dimensional periodic structure shown in FIGS. 1A and 1B will be described in FIGS. 20A to 20K, the structure shown in FIGS. 8A and 8B and the structure shown in FIGS. 14A and 14B can be produced in a similar manner.

As shown in FIGS. 20A and 20B, a layer having a two-dimensional periodic structure 510 is formed on a substrate 501, wherein square columns 511 made of a first medium and parallel to the y axis direction are spaced apart by an interval P, and regions 512 other than the square columns 511 are filled in with a second medium. As shown in FIGS. 20C and 20D, a layer having a two-dimensional periodic structure 520 is formed, wherein rectangular parallelepipeds 521 made of the first medium are spaced at intervals P in the x and y directions, and a region 522 other than the rectangular parallelepipeds 521 is filled in with the second medium. As shown in FIGS. 20E and 20F, a layer having a two-dimensional periodic structure 530 is formed, wherein square columns 531 made of the first medium and parallel to the x axis are spaced apart by an interval P, and regions 532 other than the square columns 531 are filled in with the second medium. As shown in FIGS. 20G and 20H, a layer having a two-dimensional periodic structure 540 is formed, wherein rectangular parallelepipeds 541 made of the first medium are spaced apart by an interval P in the x and y directions, and a region 542 other than the rectangular parallelepipeds 541 is filled in with the second medium. As shown in FIGS. 20I and 20J, a layer having a two-dimensional periodic structure 550 is formed, wherein square columns 551 made of the first medium and parallel to the y axis are spaced apart by an interval P while being arranged at positions shifted from the square columns 511 by P/2 in the x axis direction, and regions 552 other than the square columns 551 are filled in with the second medium. As described above, the layer having the two-dimensional structure containing the square columns and the layer having the two-dimensional structure containing the rectangular parallelepipeds are formed alternately and, thereby, a basic period of the three-dimensional periodic structure shown in FIG. 20K can be produced. Furthermore, the present steps are repeated and, thereby, the three-dimensional periodic structure exhibiting a wide complete photonic band gap, as shown in FIG. 1A, can be produced.

The two-dimensional periodic structure is produced by an interference exposure method, a nanoimprinting method, a method through the use of a multiphoton absorption process by ultrashort pulsed light, e.g., an fs laser, or a method through the use of photolithography, e.g., electron beam exposure or near-field exposure, and stacking is performed by a wafer bonding or the like to produce the three-dimensional periodic structure.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-063965 filed Mar. 8, 2004, which is hereby incorporated by reference herein.

What is claimed is:

1. A three-dimensional periodic structure exhibiting a photonic band gap comprising:

a first layer including a plurality of square columns spaced apart by a predetermined interval;

a second layer including a plurality of square columns spaced apart by a predetermined interval, the square columns extending in a direction different from that of the square columns in the first layer;

a third layer including a plurality of square columns spaced apart by a predetermined interval, the square columns extending in the same direction as that of the square columns in the first layer;

a fourth layer including a plurality of square columns spaced apart by a predetermined interval, the square columns extending in the same direction as that of the square columns in the second layer; and additional layers, each including one layer containing rectangular parallelepipeds disposed discretely in a plane parallel to each of the first, second, third, and fourth layers, wherein the first, second, third and fourth layers are stacked sequentially with the additional layer therebetween, the first layer and the third layer are stacked such that the square columns contained in the first and third layers mutually shift by one-half the predetermined interval in a direction perpendicular to the direction of the extension of the square columns, the second layer and the fourth layer are stacked such that the square columns contained in the second and fourth layers mutually shift by one-half the predetermined interval in a direction perpendicular to the direction of the extension of the square columns, rectangular parallelepipeds contained in the additional layers are disposed at positions corresponding to intersections of the square columns, the square columns contained in the first, second, third and fourth layers and the rectangular parallelepipeds contained in the additional layers are formed from a first medium, regions contained in the first, second, third and fourth layers other than the square columns and regions contained in the additional layers other than the rectangular parallelepipeds are formed from a second medium having a refractive index lower than that of the first medium, when the length of one side of the rectangular parallelepiped contained in the additional layer is assumed to be W1 in a plane parallel to each of the first, second, third, and fourth layers and the width of the square column in the direction perpendicular to the direction of extension of the square column is assumed to be W in a plane parallel to each of the first, second, third, and fourth layers, $$1.21 \leq W1/W \leq 2.39$$

is satisfied, and when the length of the other side perpendicular to the side having a length of W1 of the rectangular parallelepiped contained in the additional layer is assumed to be W2 in a plane parallel to each of the first, second, third, and fourth layers, $$W/W1 < W2/W$$

is satisfied.

2. A three-dimensional periodic structure exhibiting a photonic band gap comprising:

a first layer including a plurality of square columns spaced apart by a predetermined intervals;

a second layer including a plurality of square columns spaced apart by a predetermined interval, the square columns extending in a direction different from that of the square columns in the first layer;

a third layer including a plurality of square columns spaced apart by a predetermined interval, the square columns extending in the same direction as that of the square columns in the first layer;

a fourth layer including a plurality of square columns spaced apart by a predetermined interval, the square columns extending in the same direction as that of the square columns in the second layer; and additional layers, each including at least two layers containing rectangular parallelepipeds disposed discretely in a plane parallel to each of the first, second, third and fourth layers, wherein the first, second, third and fourth layers are stacked sequentially with the additional layer therebetween, the first layer and the third layer are stacked such that the square columns contained in the first and third layers mutually shift by one-half the predetermined interval in a direction perpendicular to the direction of the extension of the square columns, the second layer and the fourth layer are stacked such that the square columns contained in the second and fourth layers mutually shift by one-half the predetermined interval in a direction perpendicular to the direction of the extension of the square columns, the rectangular parallelepipeds contained in the additional layers are disposed at positions corresponding to intersections of the square columns, the square columns contained in the first, second, third and fourth layers and the rectangular parallelepipeds contained in the additional layers are formed from a first medium, regions contained in the first, second, third and fourth layers other than the square columns and regions contained in the additional layers other than the rectangular parallelepipeds are formed from a second medium having a refractive index lower than that of the first medium, when the length of a side of the rectangular parallelepiped contained in the additional layer adjacent to the layer containing the square columns is assumed to be W1 in a plane parallel to each of the first, second, third, and fourth layers, the side being along the direction perpendicular to the direction of extension of the adjacent square column, and the width of the square column in the direction perpendicular to the direction of extension of the square column is assumed to be W in a plane parallel to each of the first, second, third, and fourth layers, $$0.81 \leq W1/W \leq 1.87$$

is satisfied, and when the length of a side of the rectangular parallelepiped contained in the additional layer adjacent to the layer containing the square columns is assumed to be W2 in a plane parallel to each of the first, second, third, and fourth layers, the side being along the direction parallel to the direction of extension of the adjacent square column, $$W/W1 < W2/W$$

is satisfied.

3. The three-dimensional periodic structure according to claim 1, wherein when the length of a side of the rectangular parallelepiped contained in the additional layer is assumed to be W1 in a plane parallel to each of the first, second, third, and fourth layers, the side being along the direction perpendicular to the direction of extension of the adjacent square column, and the width of the square column in the direction perpendicular to the direction of extension of the square column is assumed to be W in a plane parallel to each of the first, second, third, and fourth layers, $$1.33 \leq W1/W \leq 2.18$$

is satisfied.

4. The three-dimensional periodic structure according to claim 2, wherein when the length of a side of the rectangular parallelepiped contained in the additional layer adjacent to the layer containing the square columns is assumed to be W1 in a plane parallel to each of the first, second, third, and fourth layers, the side being along the direction perpendicular to the direction of extension of the adjacent square column, and the width of the square column in the direction perpendicular to the direction of extension of the square column is assumed to be W in a plane parallel to each of the first, second, third, and fourth layers, $$0.92 \leq W1/W \leq 1.59$$

is satisfied.

5. The three-dimensional periodic structure according to claim 1, wherein the additional layer includes a layer containing rectangular parallelepipeds having a length in the direction of extension of the square columns contained in the first layer equal to a length in the direction of extension of the square columns contained in the second layer, in a plane parallel to each of the first, second, third, and fourth layers.

6. The three-dimensional periodic structure according to claim 2, wherein the additional layer includes a layer containing rectangular parallelepipeds having a length in the direction of extension of the square columns contained in the first layer different from a length in the direction of extension of the square columns contained in the second layer, while the length in the direction of extension of the square columns contained in the square column-containing layer adjacent to the layer containing the rectangular parallelepipeds is longer than the length in the other direction, in a plane parallel to each of the first, second, third, and fourth layers.

7. The three-dimensional periodic structure according to any one of claim 1 to claim 6, wherein the angle between the direction of extension of the square columns contained in the first layer and the direction of extension of the square columns contained in the second layer is 90 degrees.

8. A functional element comprising a structure in which a plurality of three-dimensional periodic structures according to any one of claim 1 to claim 6 are stacked, wherein the structure comprises a linear defect portion, and the linear defect portion functions as a waveguide.

9. A functional element comprising a structure in which a plurality of three-dimensional periodic structures according to any one of claim 1 to claim 6 are stacked, wherein the structure comprises a point defect portion, and the point defect portion functions as a resonator.

10. A light-emitting device comprising the functional element according to claim 9 containing an active medium in the point defect portion and an excitation device to excite the active medium, the active medium exhibiting a light emitting action.

11. The light-emitting device according to claim 10, wherein the light-emitting device is a laser.

* * * * *